(12) United States Patent
Laitt

(10) Patent No.: US 10,675,661 B2
(45) Date of Patent: Jun. 9, 2020

(54) SYSTEMS AND METHODS FOR USE IN PROCESSING OF FOREST RESIDUE

(71) Applicant: BIOFUELS TECHNOLOGY LLC, Austin, TX (US)

(72) Inventor: Andrew Laitt, Brighton (GB)

(73) Assignee: BIOFUELS TECHNOLOGY LLC, Austin, TX (US)

( * ) Notice: Subject to any disclaimer, the term of this patent is extended or adjusted under 35 U.S.C. 154(b) by 349 days.

(21) Appl. No.: 15/737,109

(22) PCT Filed: Jun. 15, 2016

(86) PCT No.: PCT/US2016/037606
§ 371 (c)(1),
(2) Date: Dec. 15, 2017

(87) PCT Pub. No.: WO2016/205355
PCT Pub. Date: Dec. 22, 2016

(65) Prior Publication Data
US 2018/0169707 A1    Jun. 21, 2018

Related U.S. Application Data

(60) Provisional application No. 62/293,334, filed on Feb. 10, 2016, provisional application No. 62/274,995, (Continued)

(51) Int. Cl.
*B02C 18/14* (2006.01)
*B07C 5/14* (2006.01)
(Continued)

(52) U.S. Cl.
CPC .............. *B07C 5/14* (2013.01); *B02C 18/14* (2013.01); *B07B 9/00* (2013.01); *B07B 15/00* (2013.01);
(Continued)

(58) Field of Classification Search
CPC ............ B02C 13/286; B02C 13/28609; B02C 13/28618; B02C 13/28636;
(Continued)

(56) References Cited

U.S. PATENT DOCUMENTS 3,964,716 A    6/1976  McCorkle et al.
4,227,653 A    10/1980 Jetzer
(Continued)

FOREIGN PATENT DOCUMENTS

WO    WO 93/25324      12/1993
WO    WO 2000/039255   7/2000

OTHER PUBLICATIONS

Supplementary European Search Report issued in corresponding European Patent Application No. 16812327, dated Feb. 1, 2019.
(Continued)

*Primary Examiner* — Matthew Katcoff
(74) *Attorney, Agent, or Firm* — Norton Rose Fulbright US LLP

(57) ABSTRACT

This disclosure includes systems and methods that may be used in forest residue processing. Some systems use or include: a filter configured to filter elements based on element size, a separator configured to separate elements based on element areal density, a separator configured to separate elements based on element density, and/or a sorter configured to sort elements based on element wood fiber content.

20 Claims, 21 Drawing Sheets

Related U.S. Application Data filed on Jan. 5, 2016, provisional application No. 62/387,303, filed on Dec. 23, 2015, provisional application No. 62/175,786, filed on Jun. 15, 2015.

(51) Int. Cl.
*C10L 5/44* (2006.01)
*D21B 1/02* (2006.01)
*B07B 15/00* (2006.01)
*B09B 3/00* (2006.01)
*B09B 5/00* (2006.01)
*B07B 9/00* (2006.01)
*B07C 5/342* (2006.01)
*B07C 5/36* (2006.01)

(52) U.S. Cl.
CPC ............ *B07C 5/3422* (2013.01); *B07C 5/365* (2013.01); *B09B 3/00* (2013.01); *B09B 5/00* (2013.01); *C10L 5/442* (2013.01); *D21B 1/023* (2013.01); *B02C 18/145* (2013.01); *C10L 2290/28* (2013.01); *C10L 2290/54* (2013.01); *C10L 2290/546* (2013.01); *C10L 2290/547* (2013.01); *Y02E 50/10* (2013.01); *Y02E 50/30* (2013.01)

(58) Field of Classification Search
CPC ........ B02C 13/28627; B02C 13/28672; B02C 13/288; B02C 23/02; B02C 23/08; B02C 23/10; B02C 23/12; B02C 23/14; B02C 23/16; B02C 18/22; B02C 18/2216; B02C 18/2225; B02C 18/2233; B02C 18/2241; B02C 21/02; B02C 21/026; B09B 3/00; B07C 5/04; B07C 5/12; B07C 5/14; B27L 11/00; B27L 11/002; B27L 11/02; B27L 11/04; B27L 11/06; B27L 11/08
See application file for complete search history.

(56) References Cited

U.S. PATENT DOCUMENTS

| | | |
|---|---|---|
| 4,332,353 A | 6/1982 | Lario et al. |
| 4,433,813 A | 2/1984 | Whatton et al. |
| 4,598,875 A * | 7/1986 | Bronson ................. B02C 23/12 241/101.76 |
| 5,577,671 A | 11/1996 | Seppanen et al. |
| 6,260,777 B1 * | 7/2001 | Seppanen ................. B07B 9/00 241/19 |
| 8,846,123 B2 | 9/2014 | Zeeck |
| 9,839,915 B2 * | 12/2017 | Hunker ............... B02C 19/0012 |
| 2013/0200181 A1 | 8/2013 | Lanning et al. |

OTHER PUBLICATIONS

International Preliminary Report on Patentability issued in PCT Application No. PCT/US2016/037606, dated Dec. 19, 2017.
International Search Report and Written Opinion issued in PCT Application No. PCT/US2016/037606, dated Oct. 20, 2016.

* cited by examiner

SYSTEMS AND METHODS FOR USE IN PROCESSING OF FOREST RESIDUE

CROSS-REFERENCES TO RELATED APPLICATIONS

This application is a national phase application under 35 U.S.C. § 371 of International Application No. PCT/US2016/037606, filed Jun. 15, 2016, which claims the benefit of U.S. Provisional Application Nos.: (1) 62/175,786, filed Jun. 15, 2015, (2) 62/387,303, filed Dec. 23, 2015, (3) 62/274,995, filed Jan. 5, 2016, and (4) 62/293,334, filed Feb. 10, 2016. The entire contents of the above-referenced applications are incorporated herein by reference.

BACKGROUND

1. Field of Invention

The present invention relates generally to forest product utilization, and more specifically, but not by way of limitation, to systems and methods that may be used in processing of forest residue to produce wood fiber.

2. Description of Related Art

Forest residue, which may include logging residue, stumps, thinning residue, fuel treatment thinnings, urban residue, forest and wood products industry residue, other woody biomass residue, and/or the like, represents a large and often underutilized source of wood fiber (e.g., for producing energy, making products, and/or the like). For example, many elements of forest residue may be undesirable for use in wood-based products, and forest residue, which is typically bulky, having a relatively low density, may be uneconomic to transport. Thus, currently, forest residue may have relatively little commercial value.

In some instances, forest residue may be used as a (e.g., low-grade) fuel, sometimes referred to as hog fuel. For example, freshly harvested wood fiber may contain moisture, in some instances, such wood fiber may have a moisture content as high as 50-60%. For commercial applications, wood fiber having a moisture content of 10% or less may be desirable; therefore, freshly harvested wood fiber may often be dried in a wood drier. Hog fuel, which may be made by size-reducing (e.g., chipping, shredding, grinding, and/or the like) forest residue, may provide a relatively inexpensive source of fuel to power such wood driers.

Forest residue not otherwise used for hog fuel (in some instances as much as 50% of a total amount of forest residue available) may be disposed of by burning and/or be left to decompose, for example, at a logging deck and/or in a forest (e.g., thereby having a negative environmental impact).

Examples of wood processing methods and systems are disclosed in U.S. Pat. Nos. 6,260,777 (1); and 5,577,671 (2).

SUMMARY

Some embodiments of the present disclosure are configured for and/or include: (1) recovering wood fiber from forest residue (e.g., including branch sections) (e.g., on an industrial scale and in an economical fashion); (2) producing hog fuel from forest residue, in some instances, while optimizing recovery of wood fiber from the forest residue; (3) separating elements of a forest residue feed into various sub-feeds based on physical characteristics of the elements (e.g., where such sub-feeds may have respective element chemistries that vary from one sub-feed to another one of the sub-feeds, are determinable, and/or are controllable); and/or the like.

Some embodiments of the present disclosure are configured for and/or include size-reducing forest residue elements to free and separate bark portions (e.g., by abrading, shearing, peeling, and/or the like) from the forest residue elements. In some embodiments, such size-reducing is performed using a shredder. Shredders may be particularly advantageous for removing bark from forest residue elements, as chippers may be prone to cutting too deeply into forest residue elements to effectively remove bark from the forest residue elements, grinders, which typically operate by flailing, may not be capable of cutting into forest residue elements in a way that effectively removes bark from the forest residue elements, and granulators may particulate forest residue elements before bark can be effectively removed from the forest residue elements. In some embodiments, such a shredder may be a low-speed shredder, such as, for example, a shredder configured to operate at a rotor speed of from 50 to 250 rpm, which may facilitate the shredder in removing bark from forest residue elements.

Some embodiments of the present disclosure are configured for and/or include, aerodynamically separating leaves, needles, and/or the like from forest residue elements (e.g., by passing the forest residue elements through a flow of air).

Some embodiments of the present disclosure are configured for and/or include, selectively diverting at least some forest residue elements from a forest residue feed to a hog fuel feed (e.g., to optimize recovery of wood fiber from the forest residue feed, while providing for an adequate supply of hog fuel).

Some embodiments of the present systems for producing wood fiber from forest residue comprise: a first filter configured to receive at least a portion of a forest residue feed and filter the at least a portion of the forest residue feed into a first large-elements feed having a first maximum element size and a first small-elements feed having a second maximum element size that is smaller than the first maximum element size, a first separator configured to receive at least a portion of the first large-elements feed and separate the at least a portion of the first large-elements feed into a high-areal-density-elements feed and a low-areal-density-elements feed having a lower maximum element areal density than that of the high-areal-density-elements feed, a second separator configured to receive at least a portion of the first large-elements feed and separate the at least a portion of the first large-elements feed into a first high-density-elements feed and a first low-density-elements feed having a lower maximum element density than that of the first high-density-elements feed, and a first sorter configured to receive at least a portion of the high-areal-density-elements feed and at least a portion of the first low-density-elements feed and sort the at least a portion of the high-areal-density-elements feed and the at least a portion of the first low-density-elements feed into a first wood fiber-elements feed and a first bark-elements feed having a lower aggregate wood fiber content than that of the first wood fiber-elements feed.

Some embodiments of the present systems for producing wood fiber from forest residue comprise: a second separator configured to receive at least a portion of a forest residue feed and separate the at least a portion of the forest residue feed into a first high-density-elements feed and a first low-density-elements feed having a lower maximum element density than that of the first high-density-elements feed, a first filter configured to receive at least a portion of the first-low-density-elements feed and filter the at least a portion of the first low-density-elements feed into a first large-elements feed having a first maximum element size and a first small-elements feed having a second maximum element size that is smaller than the first maximum element size, and a first sorter configured to receive at least a portion of the first large-elements feed and filter the at least a portion of the first large-elements feed into a first wood fiber-elements feed and a first bark-elements feed having a lower aggregate wood fiber content than that of the first wood fiber-elements feed. Some systems comprise a first separator configured to receive at least a portion of the first large-elements feed and separate the at least a portion of the first large-elements feed into a high-areal-density-elements feed and a low-areal-density-elements feed having a lower maximum element areal density than that of the high-areal-density-elements feed.

In some systems, the first filter comprises at least one of: a plurality of perforated screens, a plurality of mesh screens, a flip-flop screen machine, and a star screen separator. In some systems, the first filter comprises two or more filters. In some systems, the first maximum element size is approximately 50 millimeters (mm). In some systems, the second maximum element size is approximately 8 mm. In some systems, the first filter is configured to remove granular materials from the forest residue feed. In some systems, the granular materials comprise at least one of sand, soil, and grit. In some systems, the maximum element size of the granular materials is 3 mm or smaller.

In some systems, the first separator comprises at least one of: an aerodynamic separator, a windshifter separator, and a zigzag separator. In some systems, the first separator comprises two or more separators. In some systems, the first separator is configured to receive and separate at least a portion of the first low-density-elements feed. Some systems comprise a diverter configured to selectively divert at least a portion of the first large-elements feed away from the first separator (e.g., such that the at least a portion of the first large-elements feed bypasses the first separator).

In some systems, the second separator comprises a de-stoner. In some systems, the second separator comprises a ballistic separator. In some systems, the second separator comprises two or more separators. In some systems, the second separator is configured to receive and separate at least a portion of the high-areal-density-elements feed.

In some systems, the first sorter comprises an optical sorter. In some systems, the first sorter comprises at least one of a camera and a laser. In some systems, the first sorter comprises two or more optical sorters.

Some systems comprise a first size-reducing machine, where the first filter is configured to filter the at least a portion of the forest residue feed into a second large-elements feed having a third maximum element size that is larger than the first maximum element size and the first size-reducing machine is configured to receive at least a portion of the second large-elements feed and produce a second small-elements feed having a fourth maximum element size that is smaller than the third maximum element size. In some systems, the first size-reducing machine comprises at least one of: a shredder, a grinder, and a granulator. In some systems, the third maximum element size is greater than 50 mm. In some systems, the fourth maximum element size is 50 mm or smaller.

In some systems, the first filter is configured to receive and filter at least a portion of the second small-elements feed. In some systems, the first separator is configured to receive and separate at least a portion of the second small-elements feed. In some systems, the second separator is configured to receive and separate at least a portion of the second small-elements feed.

Some systems comprise a third separator configured to receive at least a portion of the first high-density-elements feed and separate the at least a portion of the first high-density-elements feed into a second high-density-elements feed and a second low-density-elements feed having a lower maximum element density than that of the second high-density-elements feed. In some systems, the third separator comprises a de-stoner. In some systems, the third separator comprises a ballistic separator. In some systems, the first separator is configured to receive and separate at least a portion of the second low-density-elements feed. In some systems, the first sorter is configured to receive and sort at least a portion of the second low-density-elements feed. In some systems, the first filter is configured to receive at least a portion of the second low-density-elements feed and separate the at least a portion of the second low-density-elements feed into the first large-elements feed and the first small-elements feed.

Some systems comprise a second filter configured to receive at least a portion of the first bark-elements feed and filter the at least a portion of the first bark-elements feed into a third large-elements feed and a fourth small-elements feed having a seventh maximum element size that is smaller than a maximum element size of the third large-elements feed. In some systems, the second filter comprises at least one of: a perforated screen, a mesh screen, a flip-flop screen machine, and a star screen separator. In some systems, the seventh maximum element size is approximately 8 mm or approximately 20 mm.

In some systems, the first sorter is configured to receive at least a portion of the third large-elements feed. In some systems, the first size-reducing machine is configured to receive at least a portion of the third large-elements feed. In some systems, the hog fuel feed is configured to receive at least a portion of the fourth small-elements feed.

In some systems, the first bark-elements feed has a fifth maximum element size, the system comprises a second size-reducing machine configured to receive at least a portion of the first bark-elements feed and produce a third small-elements feed having a sixth maximum element size that is smaller than the fifth maximum element size, and the second filter is configured to receive at least a portion of the third small-elements feed. In some systems, the second size-reducing machine comprises at least one of: a shredder, a grinder, and a granulator. In some systems, the fifth maximum element size is approximately 50 mm. In some systems, the sixth maximum element size is approximately 25 mm.

Some systems comprise a second sorter configured to receive at least a portion of the first bark-elements feed and sort the at least a portion of the first bark-elements feed into a second wood fiber-elements feed and a second bark-elements feed having a lower aggregate wood fiber content than that of the second wood fiber-elements feed. In some systems, the first size-reducing machine is configured to receive at least a portion of the second bark-elements feed.

Some systems comprise a hog fuel feed configured to receive at least one of: at least a portion of the first small-elements feed, at least a portion of the first high-density-elements feed, at least a portion of the low-areal-density-elements feed, and at least a portion of the first bark-elements feed.

Some systems comprise a diverter configured to receive at least a portion of the first large-elements feed and selectively divert the at least a portion of the first large-elements feed to the hog fuel feed. In some systems the diverter is configured to receive at least a portion of the first low-density-elements feed.

Some systems comprise one or more sensors configured to capture data indicative of a flow rate of elements in the hog fuel feed and a processor configured to control, based at least in part on the data captured by the one or more sensors, the diverter. In some systems, the processor is configured to control the diverter to selectively divert the at least a portion of the first large-elements feed to the hog fuel feed if a flow rate of elements equal to the sum of at least one of: a flow rate of elements in the at least a portion of the first small-elements feed, a flow rate of elements in the at least a portion of the first high-density-elements feed, a flow rate of elements in the at least a portion of the low-areal-density-elements feed, and a flow rate of elements in the at least a portion of the first bark-elements feed is below a threshold flow rate.

Some systems comprise a diverter configured to receive at least a portion of the forest residue feed and selectively divert the at least a portion of the forest residue feed away from the first filter.

Some systems comprise a first store configured to receive at least a portion of the first high-density-elements feed. In some systems, the first store is configured to receive at least a portion of the second high-density-elements feed. Some systems comprise a second store configured to receive at least a portion of the granular materials.

Some systems comprise a magnetic separator configured to remove ferromagnetic materials from at least a portion of the forest residue feed.

Some embodiments of the present systems for producing wood fiber from forest residue comprise: a filter configured to receive at least a portion of a forest residue feed and filter the received portion into a first large-elements feed having a first maximum element size and a small-elements feed having a second maximum element size that is smaller than the first maximum element size, a first sorter configured to receive at least a portion of the first large-elements feed and sort the received portion into a first wood fiber-elements feed and a first bark-elements feed having a lower aggregate wood fiber content than that of the first wood fiber-elements feed, and a size-reducing machine configured to receive at least a portion of the first bark-elements feed and produce a reduced-size bark-elements feed, where the filter is configured to receive and filter at least a portion of the reduced-size bark-elements feed. In some systems, the first maximum element size is approximately 50 mm, and/or the second maximum element size is approximately 10 mm.

Some systems comprise a hog fuel feed configured to receive at least a portion of the small-elements feed. Some systems comprise a diverter configured to divert at least a portion of the forest residue feed to a hog fuel feed.

In some systems, the size-reducing machine comprises a shredder. In some systems, the shredder comprises a rotor including a plurality of teeth, and the rotor is configured to rotate at a rotational speed of between 50 rpm and 250 rpm. In some systems, the filter is configured to filter at least a portion of the forest residue feed into a second large-elements feed having a third maximum element size that is larger than the first maximum element size and the size-reducing machine is configured to receive and size-reduce at least a portion of the second large-elements feed.

Some systems comprise a first separator configured to receive at least a portion of the forest residue feed and separate the received portion into a first high-density-elements feed and a first low-density-elements feed having a lower maximum element density than that of the first high-density-elements feed, where the first sorter is configured to receive and sort at least a portion of the first low-density-elements feed. In some systems, the filter is configured to receive and filter at least a portion of the first low-density-elements feed. In some systems, the first separator comprises a de-stoner, a ballistic separator, and/or an aerodynamic separator.

Some systems comprise a second separator configured to receive at least a portion of the first high-density-elements feed and separate the received portion into a second high-density-elements feed and a second low-density-elements feed having a lower maximum element density than that of the second high-density-elements feed, where the first sorter is configured to receive and sort at least a portion of the second low-density-elements feed.

Some systems comprise a second separator configured to receive at least a portion of the forest residue feed and separate the received portion into a high-areal-density-elements feed and a low areal-density-elements feed having a lower maximum element areal density than that of the high-areal-density-elements feed, where the first sorter is configured to receive and sort at least a portion of the high-areal-density-elements feed. In some systems, the second separator is configured to receive and separate at least a portion of the first low-density-elements feed. In some systems, the first separator is configured to receive and separate at least a portion of the high-areal-density-elements feed. In some systems, the second separator comprises an aerodynamic separator.

Some systems comprise a second sorter configured to receive at least a portion of the first bark-elements feed and sort the received portion into a second wood fiber-elements feed and a second bark-elements feed having a lower aggregate wood fiber content than that of the second wood fiber-elements feed. In some systems, the first sorter and/or the second sorter comprises an optical sorter.

Some embodiments of the present methods for producing wood fiber from forest residue comprise: filtering a forest residue feed into a first large-elements feed having a first maximum element size and a first small-elements feed having a second maximum element size that is smaller than the first maximum element size, providing at least a portion of the first large-elements feed to a hog fuel feed, separating at least a portion of the first large-elements feed into a first high-density-elements feed and a first low-density-elements feed having a lower maximum element density than that of the first high-density-elements feed, and sorting at least a portion of the first low-density-elements feed into a first wood fiber-elements feed and a first bark-elements feed having a lower aggregate wood fiber content than that of the first wood fiber-elements feed.

Some embodiments of the present methods for producing wood fiber from forest residue comprise: filtering a forest residue feed into a first large-elements feed having a first maximum element size and a first small-elements feed having a second maximum element size that is smaller than the first maximum element size, separating at least a portion of the first large-elements feed into a high-areal-density-elements feed and a low-areal-density-elements feed having a lower maximum element areal density than that of the high-areal-density-elements feed, separating at least a portion of the first large-elements feed into a first high-density-elements feed and a first low-density-elements feed having a lower maximum element density than that of the first high-density-elements feed, and sorting at least a portion of the high-areal-density-elements feed and at least a portion of the first low-density-elements feed into a first wood fiber-elements feed and a first bark-elements feed having a lower aggregate wood fiber content than that of the first wood fiber-elements feed. Some methods comprise providing at least a portion of the first large-elements feed to a hog fuel feed.

Some embodiments of the present methods for producing wood fiber from forest residue comprise: separating at least a portion of a forest residue feed into a first high-density-elements feed and a first low-density-elements feed having a lower maximum element density than that of the first high-density-elements feed, filtering at least a portion of the first low-density-elements feed into a first large-elements feed having a first maximum element size and a first small-elements feed having a second maximum element size that is smaller than the first maximum element size, and sorting at least a portion of the first large-elements feed into a first wood fiber-elements feed and a first bark-elements feed having a lower aggregate wood fiber content than that of the first wood fiber-elements feed.

Some methods comprise separating at least a portion of the first large-elements feed into a high-areal-density-elements feed and a low-areal-density-elements feed having a lower maximum element areal density than that of the high-areal-density-elements feed and sorting at least a portion of the high-areal-density-elements feed into the first wood fiber-elements feed and the first bark-elements feed.

In some methods, the first maximum element size is approximately 50 mm. In some methods, the second maximum element size is approximately 8 mm. In some methods, the forest residue feed comprises at least one of: shredded, ground, and chipped forest residue. Some methods comprise removing ferromagnetic materials from at least a portion of the forest residue feed.

Some methods comprise separating at least a portion of the high-areal-density-elements feed into the first high-density-elements feed and the first low-density-elements feed. Some methods comprise separating at least a portion of the first low-density-elements feed into the high-areal-density-elements feed and the low-areal-density-elements feed. Some methods comprise filtering at least a portion of the second low-density-elements feed into the first large-elements feed and the first small-elements feed.

Some methods comprise filtering the forest residue feed into a second large-elements feed having a third maximum element size that is larger than the first maximum element size and reducing the size of the second large-elements feed to produce at least a portion of a second small-elements feed having a fourth maximum element size that is smaller than the third maximum element size. In some methods, reducing the size of the second large-elements feed comprises at least one of: shredding, grinding, and granulating. In some methods, the third maximum element size is greater than 50 mm. In some methods, the fourth maximum element size is 50 mm or smaller.

Some methods comprise filtering at least a portion of the second small-elements feed into at least one of: the first large-elements feed, the first small-elements feed, and the second large-elements feed. Some methods comprise separating at least a portion of the second small-elements feed into the high-areal-density-elements feed and the low-areal-density-elements feed. Some methods comprise separating at least a portion of the second small-elements feed into the first high-density-elements feed and the first low-density-elements feed.

Some methods comprise separating the first high-density-elements feed into a second high-density-elements feed and a second low-density-elements feed having a lower maximum element density than that of the second high-density-elements feed. Some methods comprise sorting at least a portion of the second low-density-elements feed into the first wood fiber-elements feed and the first bark-elements feed. Some methods comprise separating at least a portion of the second low-density-elements feed into the high-areal-density-elements feed and the low-areal-density-elements feed.

Some methods comprise filtering at least a portion of the first bark-elements feed into a third large-elements feed and a fourth small-elements feed having a seventh maximum element size that is smaller than a maximum element size of the third large-elements feed. In some methods, the seventh maximum element size is approximately 8 mm or approximately 20 mm. Some methods comprise sorting at least a portion of the third large-elements feed into the first wood fiber-elements feed and the first bark-elements feed. Some methods comprise reducing the size of at least a portion of the third large-elements feed to produce at least a portion of the second small-elements feed.

In some methods, the first bark-elements feed has a fifth maximum element size and the method comprises reducing the size of at least a portion of the first bark-elements feed to produce at least a portion of a third small-elements feed having a sixth maximum element size that is smaller than the fifth maximum element size and filtering at least a portion of the third small-elements feed into the third large-elements feed and the fourth small-elements feed. In some methods, reducing the size of at least a portion of the first bark-elements feed comprises at least one of: shredding, grinding, and granulating. In some methods, the fifth maximum element size is approximately 50 mm. In some methods, the sixth maximum element size is approximately 25 mm.

Some methods comprise sorting at least a portion of the first bark-elements feed into a second wood fiber-elements feed and a second bark-elements feed having a lower aggregate wood fiber content than that of the second wood fiber-elements feed. Some methods comprise reducing the size of at least a portion of the second bark-elements feed to produce at least a portion of the second small-elements feed.

Some embodiments of the present methods for producing wood fiber from forest residue comprise: filtering at least a portion of a forest residue feed into a first large-elements feed having a first maximum element size and a small-elements feed having a second maximum element size that is smaller than the first maximum element size, sorting at least a portion of the first large-elements feed into a first wood fiber-elements feed and a first bark-elements feed having a lower aggregate wood fiber content than that of the first wood fiber-elements feed, and size-reducing at least a portion of the first bark-elements feed to produce a reduced-size bark-elements feed, where the filtering comprises filtering at least a portion of the reduced-size bark-elements feed into the first large-elements feed and the small-elements feed. In some methods, the first maximum element size is approximately 50 mm and/or the second maximum element size is approximately 10 mm.

Some methods comprise directing at least a portion of the small-elements feed to a hog fuel feed. Some methods comprise diverting, with a diverter, at least a portion of the forest residue feed to a hog fuel feed.

In some methods, the size-reducing at least a portion of the first bark-elements feed is performed using a shredder. In some methods, the size-reducing at least a portion of the first bark-elements feed comprises contacting at least a portion of the first bark-elements feed with a rotor of the shredder, the rotor including a plurality of teeth, and rotating the rotor at a rotational speed of between 50 revolutions per minute (rpm) and 250 rpm.

In some methods, the filtering comprises filtering at least a portion of the forest residue feed into a second large-elements feed having a third maximum element size that is larger than the first maximum element size, the method comprises size-reducing at least a portion of the second large-elements feed to produce a reduced-size elements feed, and the sorting comprises sorting at least a portion of the reduced-size elements feed into the first wood fiber-elements feed and the first bark-elements feed. In some methods, the size-reducing at least a portion of the second large-elements feed is performed using a shredder.

Some methods comprise separating at least a portion of the forest residue feed into a first high-density-elements feed and a first low-density-elements feed having a lower maximum element density than that of the first high-density-elements feed, where the sorting comprises sorting at least a portion of the first low-density-elements feed into the first bark-elements feed and the first wood fiber-elements feed. In some methods, the filtering comprises filtering at least a portion of the first low-density-elements feed into the first large-elements feed and the small-elements feed. In some methods, the separating at least a portion of the forest residue feed into the first high-density-elements feed and the first low-density-elements feed is performed using a de-stoner, a ballistic separator, and/or an aerodynamic separator.

Some methods comprise separating at least a portion of the first high-density-elements feed into a second high-density-elements feed and a second low-density-elements feed having a lower maximum element density than that of the second high-density-elements feed, where the sorting comprises sorting at least a portion of the second low-density-elements feed into the first bark-elements feed and the first wood fiber-elements feed.

Some methods comprise separating at least a portion of the forest residue feed into a high-areal-density-elements feed and a low-areal-density-elements feed having a lower maximum element areal density than that of the high-areal-density-elements feed, where the sorting comprises sorting at least a portion of the high-areal-density-elements feed into the first bark-elements feed and the first wood fiber-elements feed. Some methods comprise separating at least a portion of the high-areal-density-elements feed into the first high-density-elements feed and the first low-density-elements feed. Some methods comprise separating at least a portion of the first low-density-elements feed into the high-areal-density-elements feed and the low-areal-density-elements feed. In some methods, the separating at least a portion of the forest residue feed into the high-areal-density-elements feed and the low-areal-density-elements feed is performed using an aerodynamic separator.

Some methods comprise sorting at least a portion of the first bark-elements feed into a second wood fiber-elements feed and a second bark-elements feed having a lower aggregate wood fiber content than that of the second wood fiber-elements feed. In some methods, the sorting is performed using an optical sorter.

Some embodiments of the present methods for debarking branch sections comprise: receiving, with a shredder, an input feed of elements including branch sections having bark and wood fiber, the shredder comprising a frame, a rotor rotatably coupled to the frame and including a plurality of teeth, and a cutter bar coupled to the frame and defining a plurality of recesses, each configured to receive a respective one of the teeth during rotation of the rotor relative to the frame, rotating the rotor relative to the frame at a rotational speed of between 50 revolutions per minute (rpm) and 250 (rpm), urging at least one of the branch sections toward the rotor until the branch section contacts at least one of the teeth of the rotor, peeling bark from the branch section with at least one of: the cutter bar and at least one of the teeth of the rotor, and urging the branch section past the rotor to reduce the size of the branch section with at least one of: the cutter bar and at least one of the teeth of the rotor. Some methods comprise allowing a period of time to elapse between urging the branch section toward the rotor and urging the branch section past the rotor.

In some methods, the cutter bar, within each recess, defines a cutting edge that is substantially parallel to a longitudinal axis of the rotor. In some methods, the cutter bar, within each recess, defines opposing cutting edges that are angularly disposed relative to one another and to a longitudinal axis of the rotor. In some methods, the cutter bar is coupled to the frame in fixed relation relative to the frame.

In some methods, each tooth defines a cutting edge that is substantially parallel to a longitudinal axis of the rotor. In some methods, each tooth defines opposing cutting edges that are angularly disposed relative to one another and to a longitudinal axis of the rotor. In some methods, the shredder comprises a single rotor shredder.

In some methods, the input feed of elements has a maximum element size of 50 mm or greater. In some methods, a majority of the branch sections have a maximum transverse dimension of from approximately 5 mm to approximately 25 mm. Some methods comprise outputting, from the shredder, an output feed of elements including bark and wood fiber from at least a portion of the branch sections. In some methods, the output feed of elements has a maximum element size that is less than 50 mm. In some methods, the output feed of elements has a maximum element size that is less than 40 mm. Some methods comprise separating or sorting at least a portion of the output feed of elements into a wood fiber-elements feed and a bark-elements feed having a lower aggregate wood fiber content than that of the wood fiber-elements feed.

As used in this disclosure, a "feed" of elements refers to a stream of materials that is substantially comprised of (e.g., by number, weight, volume, and/or the like) the elements, or to a structure configured to convey a stream of materials that is substantially comprised of (e.g., by number, weight, volume, and/or the like) the elements. For example, a "first large-elements feed" is either: (1) a stream of materials that is substantially comprised of (e.g., by number, weight, volume, and/or the like) large-elements; or (2) a structure configured to convey a stream of materials that is substantially comprised of (e.g., by number, weight, volume, and/or the like) large-elements.

The terms "a" and "an" are defined as one or more unless this disclosure explicitly requires otherwise. The term "substantially" is defined as largely, but not necessarily wholly, what is specified (and includes what is specified; e.g., substantially 90 degrees includes 90 degrees and substantially parallel includes parallel), as understood by a person of ordinary skill in the art. In any disclosed embodiment, the terms "substantially" and "approximately," may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF ILLUSTRATIVE EMBODIMENTS

Figure 1:
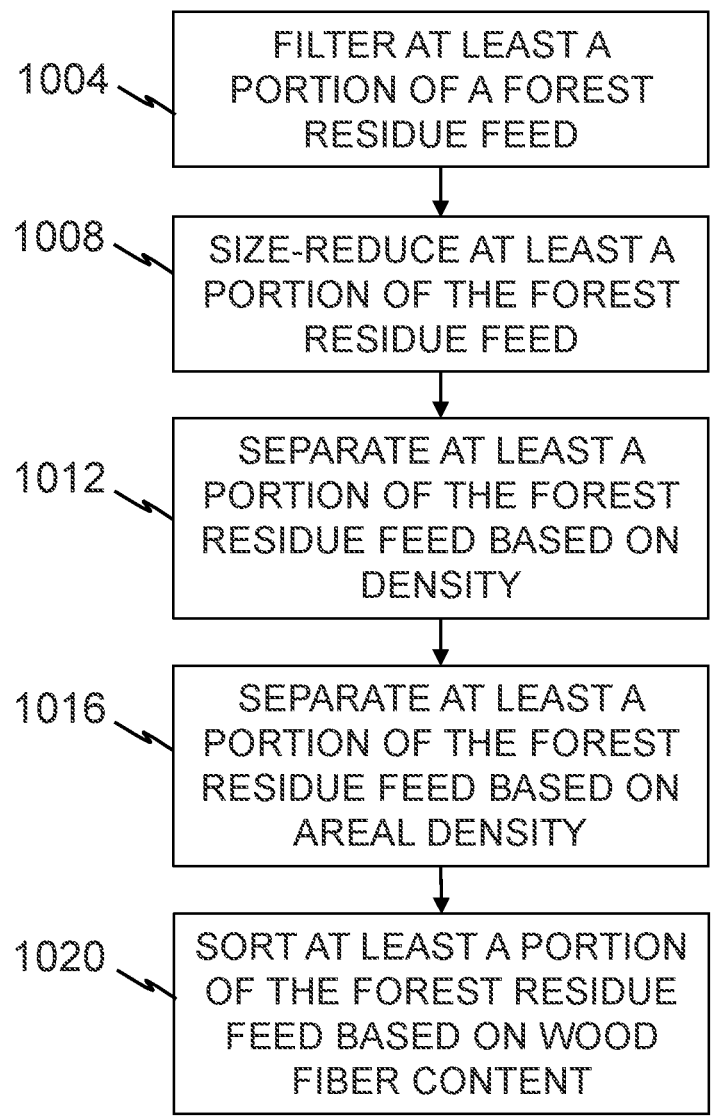
FIG. 1 is a flow chart of some embodiments of the present methods for recovering wood fiber from forest residue, which may be implemented by some embodiments of the present systems.

Embodiments of the present disclosure are described, by way of example, in the context of forest residue processing; however, components and/or steps of the present disclosure may be used in any suitable forest product utilization and/or wood processing application.

A fiber basket may refer to a total amount of biomass within a specified radius (e.g., typically, a 70 mile radius) of a wood processing facility. Embodiments of the present disclosure may be used to increase a yield of wood fiber from a fiber basket by as much as 10% to 20%. For example, embodiments of the present disclosure may be used to recover 50% or more of an amount of forest residue as usable wood fiber and provide 40% or more of the amount of forest residue as hog fuel.

Wood fiber recovered using embodiments of the present disclosure may be used, for example, as a source of renewable energy, to make various products, including, but not limited to, lumber, engineered wood board (e.g., hardboard, particle board, medium-density fibreboard, and/or the like), pulp, paper, wood chips, briquettes, pellets, and/or the like, and/or the like. Hog fuel provided by embodiments of the present disclosure may be used, for example, as fuel for a wood drier (e.g., to dry recovered wood fiber), as fuel for a combined heat and power (CHP) plant, and/or the like.

Embodiments of the present disclosure may be used to provide sand, soil, other particulate matter (e.g., particles of leaves, needles, bark, wood fiber, and/or the like) from forest residue, which may be used, for example, as a compost material, a top soil material, and/or the like. Compost and/or top soil materials provided by embodiments of the present disclosure may be used to replenish nutrients in soil, for example, at a logging operation site. Embodiments of the disclosure may be used to provide stones from forest residue (e.g., for use in road construction, landscaping, and/or the like).

Forest residue may come in various forms, such as, for example, logging residue, stumps, thinning residue, fuel treatment thinnings, urban residue, forest and wood products industry residue, other woody biomass residue, and/or the like. For example: (1) logging residue may include materials left over from logging operations and/or log processing, such as, for example, tree (e.g., whether hardwood or softwood) tops (e.g., portions of the tree above the merchantable trunk), tree lops, branches, or limbs, undersize, misshaped, diseased, dead, and/or otherwise un-merchantable trees, brush, bushes, and/or the like; (2) a stump may include the portion of a tree that is below the merchantable trunk (e.g., which is often left in the ground after the merchantable trunk has been removed and may be removed via machinery, such as, for example, an extractor), including any underground projections, such as the tap root and any lateral roots; (3) thinning residue may include brush, bushes, relatively thin trees, and/or the like that may be removed from an area in the course of land management; (4) fuel treatment thinnings may include woody materials removed from an area to mitigate fuel buildup, thereby reducing the risk of fire and/or the like; (5) urban residue may include brush, bushes, trees or portions thereof, and/or the like that may be located on or near commercial properties, residences, parks, roadways, rail tracks, utility poles and/or lines, and/or the like, which may be removed if desired and/or for safety reasons; and (6) forest and wood products industry residue may include scrap, waste, and/or otherwise un-merchantable elements containing wood fiber that may be produced by the forest and wood products industry. Forest residues may also include saplings, bark, twigs, needles, cones, fruit, seed pods, stones, grit, soil, sand, and/or the like.

Forests residue may contain elements having varying respective chemical compositions. For example, forest residue may be classified as "green" (e.g., freshly cut) and/or "brown" (e.g., dried or partially dried), and green forest residue may contain relatively large amounts of nitrogen, chlorine, and/or the like when compared to brown forest residue. Embodiments of the present disclosure may be configured to separate elements of a forest residue feed into sub-feeds based, at least in part, on such varying respective chemical compositions of the elements (e.g., in a determinable and/or controllable fashion).

Referring now to the figures, FIG. 1 is a flow chart of some embodiments of the present methods for recovering wood fiber from forest residue, which may be implemented by some embodiments of the present systems. The numbering of and the arrows between steps in FIG. 1 are merely illustrative; in some methods, step(s) may be reordered and/or omitted. Some methods include a step 1004 of filtering at least a portion of a forest residue feed to, for example, facilitate removal of granular materials, relatively small elements (e.g., having a maximum element size of approximately 8 mm or less) from which wood fiber recovery may be uneconomic, and/or the like from the forest residue feed, further processing (e.g., size-reducing) of relatively large elements (e.g., having a maximum element size of approximately 50 mm or greater), which may include significant amounts of recoverable wood fiber, and/or the like. Some methods include a step 1008 of size-reducing (e.g., shredding, grinding, granulating, and/or the like) at least a portion of the forest residue feed to, for example, liberate bark from wood fiber in elements of the forest residue feed. Step 1008 may be performed on relatively large elements (e.g., from step 1004), elements comprising bark (e.g., from step 1020), and/or the like. Some methods include a step 1012 of separating at least a portion of the forest residue feed based on density, to, for example, remove high-density elements (e.g., stones) from the forest residue feed. Step 1012 may be performed before and/or after step 1004, step 1008, step 1012, step 1016, and/or step 1020. Some methods include a step 1016 of separating at least a portion of the forest residue feed based on areal density, to, for example, remove needles, leaves, free portions of bark, and/or the like from the forest residue feed. Step 1016 may be performed before and/or after step 1004, step 1008, step 1012, and/or step 1020. Some methods include a step 1020 of sorting at least a portion of the forest residue feed based on wood fiber content, to, for example, facilitate removal of elements comprising bark from the forest residue feed. Step 1020 may be performed before and/or after step 1004, step 1008, step 1012, and/or step 1016.

Figure 2:
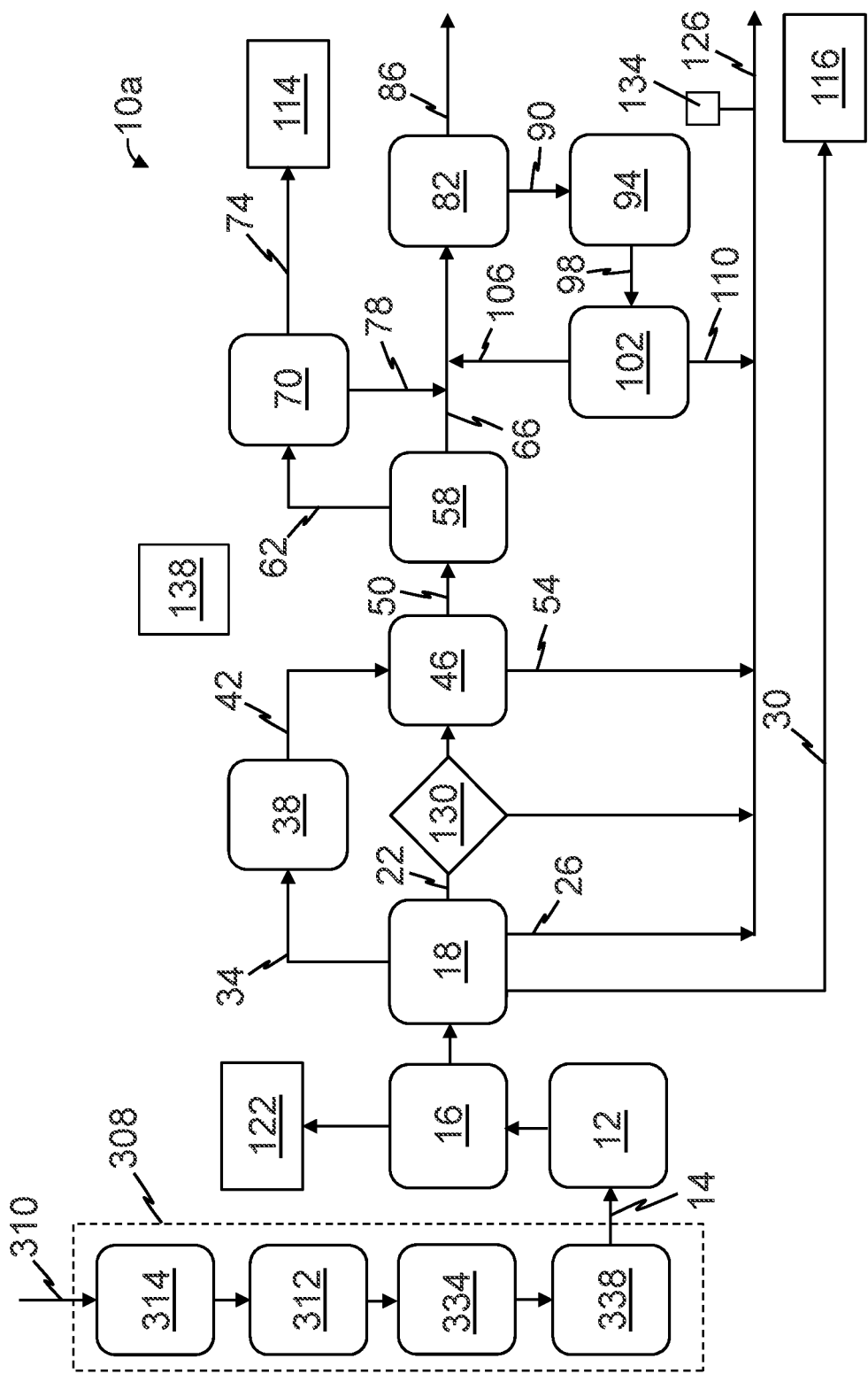
FIG. 2 is a diagram of a first embodiment of the present systems.

Referring now to FIG. 2, shown is a first embodiment 10*a* of the present systems. System 10*a* is configured to produce wood fiber (e.g., wood fiber-elements feed 86) and/or hog fuel (e.g., hog fuel feed 126) from forest residue (e.g., forest residue feed 14). System 10*a* may be installed at any suitable location, such as, for example, at an existing wood processing facility (e.g., where forest residue feed 14 may be a traditional hog fuel input, hog fuel feed 126 may provide hog fuel to one or more wood driers, and wood fiber-elements feed 86 may provide wood fiber to be dried in the one or more wood driers, for example, alongside wood fiber produced directly from logs).

A forest residue feed (e.g., 14) may comprise raw (e.g., collected from the ground) forest residue (e.g., 310) that is pre-processed, for example, via pre-processing stage(s) (e.g., 308). For example, at pre-processing stage(s) (e.g., 308), forest residue (e.g., 310) may be dried to reduce a moisture content of the forest residue and/or to separate leaves, needles, soil, sand, grit, and/or the like from other elements of the forest residue. More particularly, forest residue (e.g., 310) may be air dried (e.g., at logging deck(s) and/or in windrow(s)) for a period of time, such as, for example, from 3-12 months. If dried, forest residue (e.g., 310) may have a moisture content of approximately 35% or less (e.g., from 30-35%), a bulk density of approximately 250 kilograms per cubic meter (kg/m$^3$), and/or a needle/leaf content of approximately 2% or less by weight (sometimes referred to as "type 1" or "brown" forest residue). If not dried (e.g., freshly cut), forest residue (e.g., 310) may have a moisture content of up to approximately 55%, a bulk density of approximately 325 kg/m$^3$, and/or a needle/leaf content of approximately 10-15% by weight (sometimes referred to as "type 2" or "green" forest residue). Such drying of forest residue (e.g., 310) may increase an efficiency of and/or lower production costs associated with recovering wood fiber from the forest residue. Such drying may be particularly advantageous for stumps (e.g., once the stumps have been extracted), which may include significant amounts of soil. Embodiments of the present disclosure may be suitable for processing forest residue (e.g., 310), whether or not the forest residue has been dried.

For further example, forest residue (e.g., 310) may be size-reduced (e.g., shredded, ground, chipped, and/or the like). To illustrate, some embodiments include a chipper (e.g., 314) configured to chip forest residue (e.g., 310), such that, for example, elements of the forest residue after chipping have maximum element sizes ranging from 30 millimeters (mm) to 50 mm, are G30 size, G50 size, and/or the like. Chipping may require less energy than other forms of size reduction and/or may produce fewer fines. Some embodiments include a shredder and/or grinder (e.g., shredder 334 and grinder 338) configured to size-reduce forest residue (e.g., 310) (e.g., whether or not the forest residue has been chipped by chipper 314). Such size reduction of forest residue (e.g., 310) may liberate wood fiber from other elements of the forest residue, increase an efficiency of recovering wood fiber from the forest residue, and/or lower transportation costs associated with transporting the forest residue.

Figure 3A:
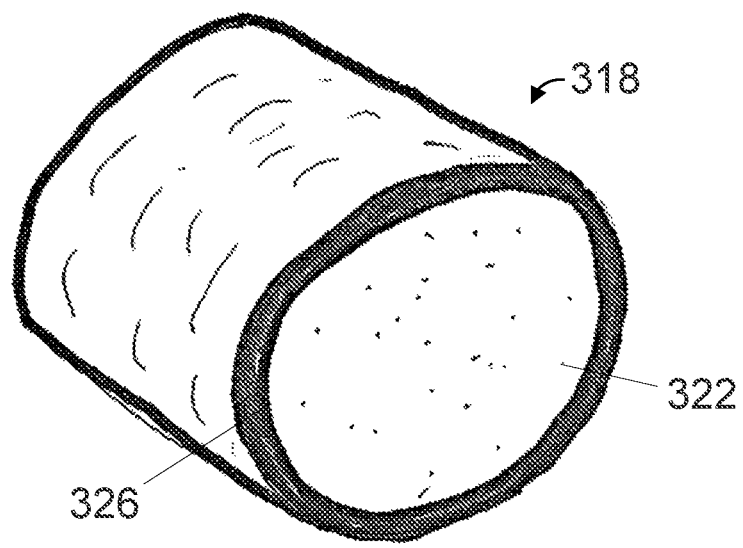
FIGS. 3A-3E depict forest residue elements at various stages of size reduction and/or bark removal pursuant to some embodiments of the present disclosure.
Figure 3B:
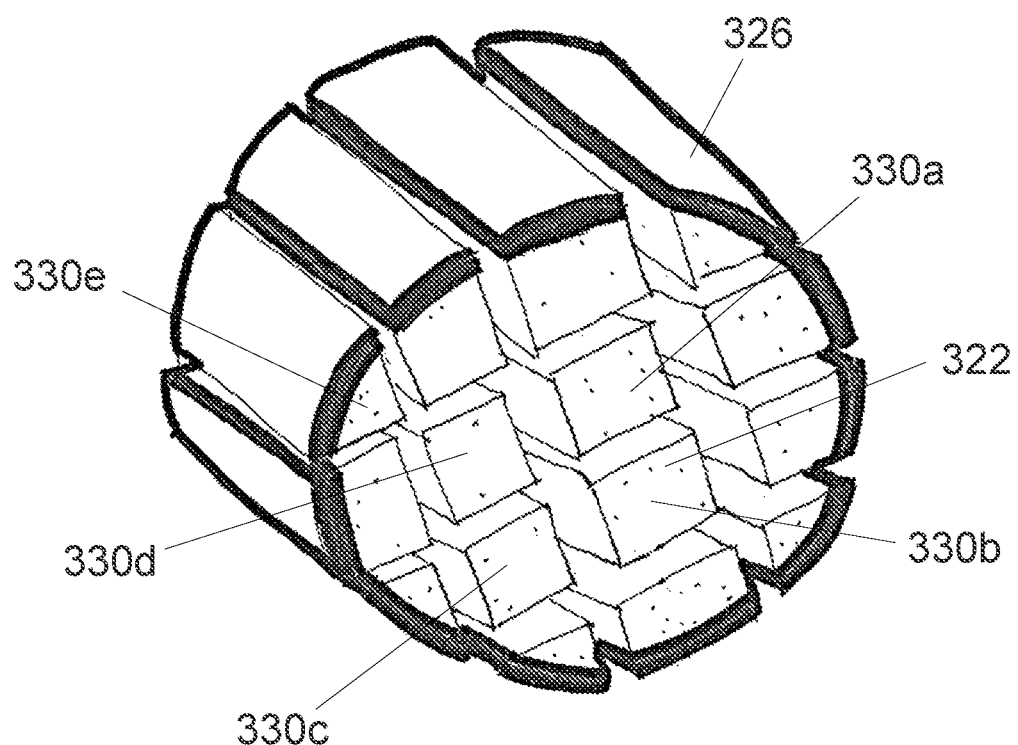
Figure 3C:
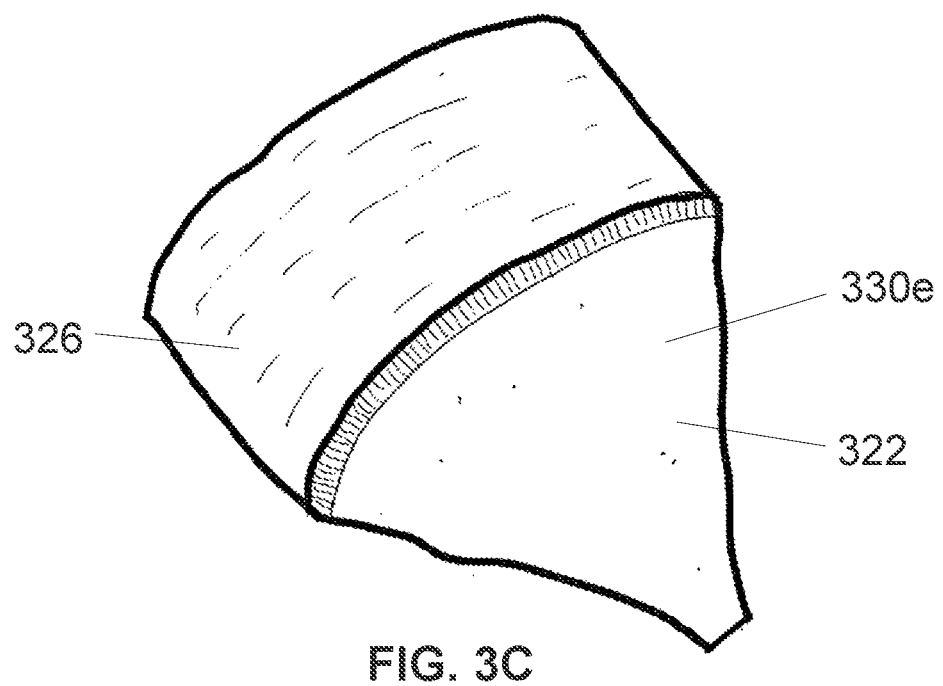
Figure 3D:
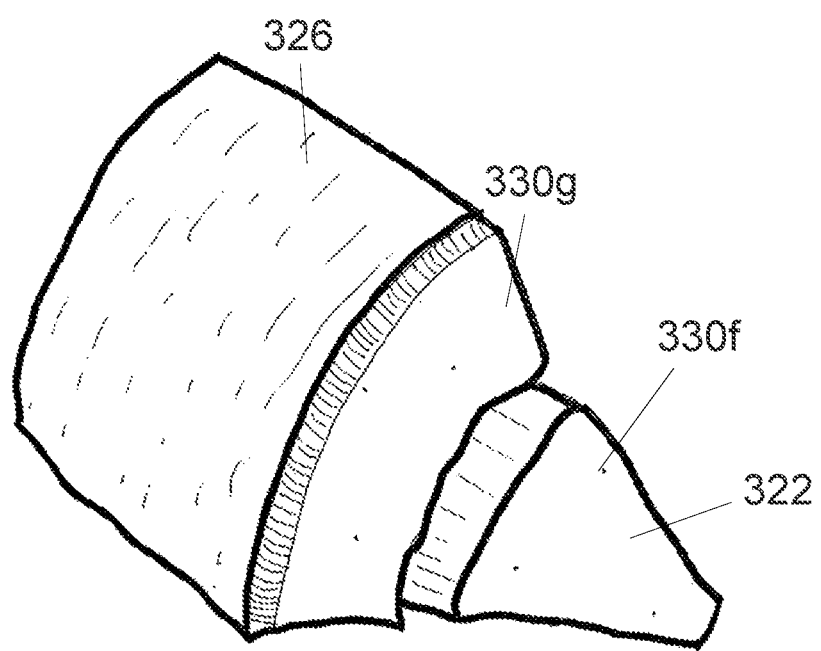
Figure 3E:
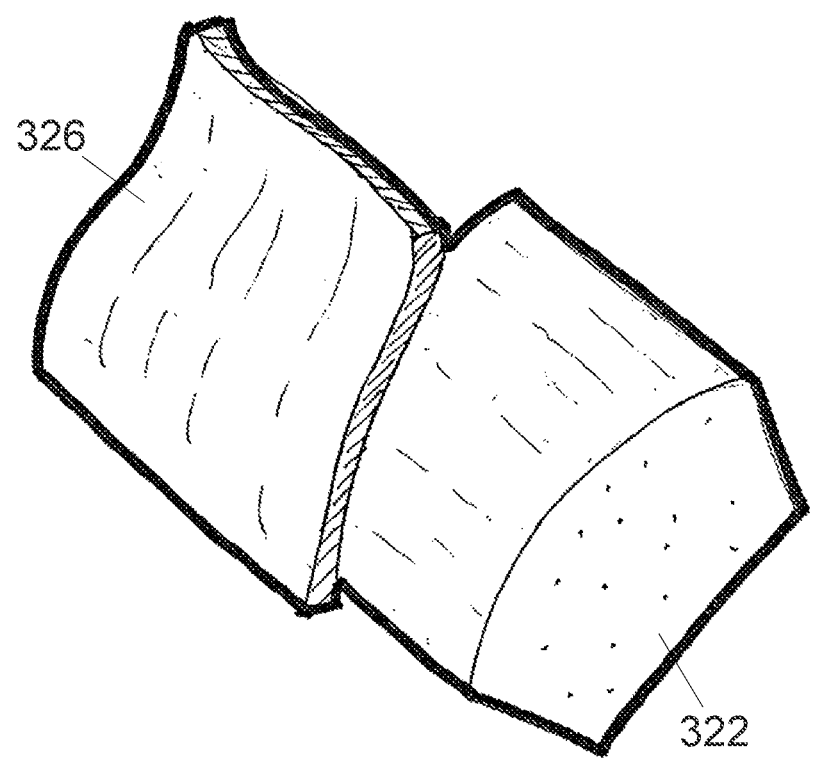

FIGS. 3A-3E depict forest residue elements at various stages of size reduction pursuant to some embodiments of the present disclosure. In the example shown, a branch section 318, which comprises wood fiber 322 and bark 326, may be an element found in raw forest residue (e.g., 310) (FIG. 3A). Branch section 318 may be chipped (e.g., with chipper 314) to produce reduced-size elements (e.g., 330a-330e) (FIG. 3B). Such chipping may result in liberation of wood fiber 322 from bark 326, as reduced-size elements 330a-330d are each substantially comprised of wood fiber. Reduced-size element 330e, despite comprising bark 326, comprises usable portions of wood fiber 322 (FIG. 3C). As such, reduced-size element 330e may be further size-reduced, for example, by shredding (e.g., with shredder 334, which may comprise a low-speed shredder and may be substantially similar to size-reducing machine 38, described in more detail below). Such shredding may cause mechanical abrading, shearing, peeling, and/or the like of bark 326 from wood fiber 322, which may be facilitated by a bond between adjacent portions of wood fiber 322 being stronger than a bond between adjacent portions of bark 326 and wood fiber. Shredding of reduced-size element 330e may produce reduced-size element 330f, which is substantially comprised of wood fiber 322, and reduced-size element 330g, which comprises a significant amount of bark 326 (FIG. 3D). Reduced-size element 330g may be yet further size-reduced, for example, by further shredding, to recover yet further wood fiber 322 by removing bark 326 (FIG. 3E).

Returning to FIG. 2, forest residue (e.g., 310) may be filtered with a filter (e.g., 312) associated with pre-processing stage(s) (e.g., 308). Such a filter (e.g., 312) may be downstream of a chipper (e.g., 314), downstream of a shredder (e.g., 334), downstream of a grinder (e.g., 338), and/or the like. At least through such a filter (e.g., 312), granular materials (e.g., 30), such as, for example, sand, soil, grit, stones, and/or the like, relatively small elements (e.g., having a maximum element size of approximately 8-10 mm), and/or the like may be removed from forest residue (e.g., 310) prior to introduction of the forest residue to other components of a system, which may be desirable when a relatively large amount of forest residue is available, processing stumps (e.g., which may include a significant amount of soil, stones, and/or the like), and/or the like. Components associated with pre-processing stage(s) (e.g., 308) may be located on-site with other components of a system (e.g., moisture analyzer 12, magnetic separator 16, filter 18, size-reducing machine 38, diverter 130, separator 46, separator 58, separator 70, sorter 82, size-reducing machine 94, filter 102, and/or the like) and/or may be located off-site (e.g., at a logging operation site).

System 10a may include a moisture analyzer 12 configured to capture data indicative of a moisture content of at least a portion of forest residue feed 14. Such data may be used (e.g., by processor 138) to control component(s) of system 10a in order to optimize wood fiber recovery from forest residue feed 14, as described in more detail below. A moisture analyzer (e.g., 12) may comprise any suitable moisture analyzer, such as, for example, an electromagnetic radiation- (e.g., infrared-), resistance-, or capacitance-based moisture analyzer.

System 10a may comprise a magnetic separator 16 configured to remove ferromagnetic materials, such as, for example, iron, steel, and/or the like, from at least a portion of forest residue feed 14. In at least this way, magnetic separator 16 may facilitate the removal of ferromagnetic contaminants from forest residue feed 14, mitigate the risk of damage that might be caused by ferromagnetic materials to components of system 10a downstream of the magnetic separator, and/or the like. A magnetic separator (e.g., 16) may comprise any suitable magnetic separator, such as, for example, a rotating drum-based magnetic separator, an over-band magnetic separator, and/or the like, and may include a vibrating infeed (e.g., to enhance removal of ferromagnetic materials). When present, a magnetic separator (e.g., 16) may be placed at any suitable location within a system, such as, for example, downstream of a filter (e.g., 18), size-reducing machine (e.g., 38), areal-density separator (e.g., 46), density separator (e.g., 58 and/or 70), sorter (e.g., 82), and/or the like. A magnetic separator (e.g., 16) may be associated with pre-processing stage(s) (e.g., 308) and configured to remove ferromagnetic materials from at least a portion of forest residue (e.g., 310).

System 10a may comprise a filter 18 configured to receive at least a portion of forest residue feed 14 and filter the received portion into various sub-feeds, each having a respective maximum element size (e.g., maximum element length, width, height, cross-sectional area, volume, and/or the like). For example, filter 18 may be configured to filter forest residue feed 14 into the sub-feeds provided in TABLE 1, below.

TABLE 1

Sub-Feeds from Filter According to Some Embodiments

| Sub-Feed | Maximum Element Size (mm) |
| --- | --- |
| First large-elements feed | 8-50 |
| Second large-elements feed | >50 |
| Small-elements feed | 3-8 |
| Granular materials | <3 |

As shown in TABLE 1, filter 18 may be configured to receive at least a portion of forest residue feed 14 and filter the received portion into a large-elements feed 22 and a small-elements feed 26 having a maximum element size that is smaller than a maximum element size of the large-elements feed. For example, the maximum element size of large-elements feed 22 may be approximately 50 mm, and the maximum element size of small-elements feed 26 may be approximately 8 mm. Since it may be relatively uneconomic to recover wood fiber from elements in small-elements feed 26 (e.g., due, at least in part, to the size of the elements), in some embodiments, a small-elements feed (e.g., 26) may be provided to a hog fuel feed (e.g., 126).

Also shown in TABLE 1, filter 18 may be configured to filter forest residue feed 14 into a large-elements feed 34 having a maximum element size that is larger than the maximum element size of large-elements feed 22. For example, the maximum element size of large-elements feed 34 may be larger than 50 mm. Large-elements feed 34, having relatively large elements, such as, for example, branch sections, may include substantial amounts of recoverable wood fiber.

Also shown in TABLE 1, filter 18 may be configured to remove granular materials 30 from forest residue feed 14. For example, granular materials 30 may have a maximum element size of approximately 3 mm or smaller. Granular materials 30 may comprise sand, soil, grit, and/or the like, as well as particulate matter, such as, for example, fine particles of wood fiber, bark, needles, leaves, pine cones, and/or the like (e.g., which may render the granular materials suitable for use as a compost material, top soil material, and/or the like). Granular materials (e.g., 30) may be removed from forest residue (e.g., 310) during pre-processing stage(s) (e.g., 308), such as, for example, by a filter (e.g., 312) (e.g., whether or not granular materials 30 are removed from a forest residue feed 14 by a filter 18).

Filter 18 may comprise a plurality of (e.g., mesh and/or perforated) screens, each configured (e.g., having openings that are dimensioned) to filter forest residue feed 14 into one or more of large-elements feed 22, small-elements feed 26, large-elements feed 34, and granular materials 30. For example, a screen configured to filter forest residue feed 14 into large-elements feed 34 and large-elements feed 22 may define openings that each have a maximum transverse dimension of between approximately 35 mm and approximately 55 mm (e.g., dimension(s) of the openings may be selected based on the size, shape, and/or the like of elements in the forest residue feed, to, for example, achieve one or more desired maximum element sizes respective to one or more given sub-feeds). Such filters (e.g., 18) may be selected or configured based on characteristics of the forest residue to be processed; for example, filters configured to process type 2 forest residue may have screens with larger openings than filters configured to process type 1 forest residue (e.g., type 2 forest residue elements may be larger, on average, than type 1 forest residue elements, due, at least in part, to having an increased moisture content). Filters (e.g., 18) may comprise any suitable filter, such as, for example, a flip-flop screen machine, a star screen separator, and/or the like.

System 10*a* may comprise a size-reducing machine 38 configured to receive at least a portion of forest residue feed 14, such as at least a portion of large-elements feed 34, and size-reduce the received portion to produce a small-elements feed 42 having a maximum element size that is smaller than a maximum element size of the received portion. The maximum element size of small-elements feed 42 may be 50 mm or smaller. A size-reducing machine (e.g., 38) may include an output screen configured to regulate the size of elements produced by the size-reducing machine. For example, size-reducing machine 38 may include an output screen defining openings, each having a maximum transverse dimension of approximately 40 mm. Size-reducing machine 38 may comprise a shredder, and more particularly, a low-speed shredder (e.g., a shredder configured to process materials at a rate on the order of 2 tons per hour). As described above for shredder 334, shredding may be particularly advantageous, as shredding may facilitate mechanical abrading, shearing, peeling, and/or the like of bark from wood fiber, as well as produce relatively few fines. Nevertheless, a size-reducing machine (e.g., 38) may comprise any suitable size-reducing machine, such as, for example, a grinder, granulator, and/or the like.

A size-reducing machine (e.g., 38) may be configured to operate without a solvent, such as, for example, water (e.g., to avoid adding moisture to forest residue within the system). Similarly to as described above for filters (e.g., 18), size-reducing machines (e.g., 38) may be selected or configured based on characteristics of the forest residue to be processed, with variables including the size of output screen openings, the size and/or number of rotor(s), and/or the like.

Figure 4A:
FIGS. 4A-4C depict forest residue elements before (FIG. 4A) and after (FIGS. 4B and 4C) size reduction pursuant to some embodiments of the present disclosure.
Figure 4B:
Figure 4C:

Size reduction of large-elements feed 34 may break down elements of the large-elements feed (e.g., which may include branch sections and/or the like), thereby liberating wood fiber from the elements. To illustrate, FIGS. 4A-4C depict forest residue elements, and more particularly, branch sections or twigs, before (FIG. 4A) and after (FIGS. 4B and 4C) size reduction pursuant to some embodiments of the present disclosure (e.g., using size-reducing machine 38). As shown, such size reduction, in addition to reducing the size of elements, effectively liberates wood fiber (FIG. 4B) from bark (FIG. 4C).

Figure 5A:
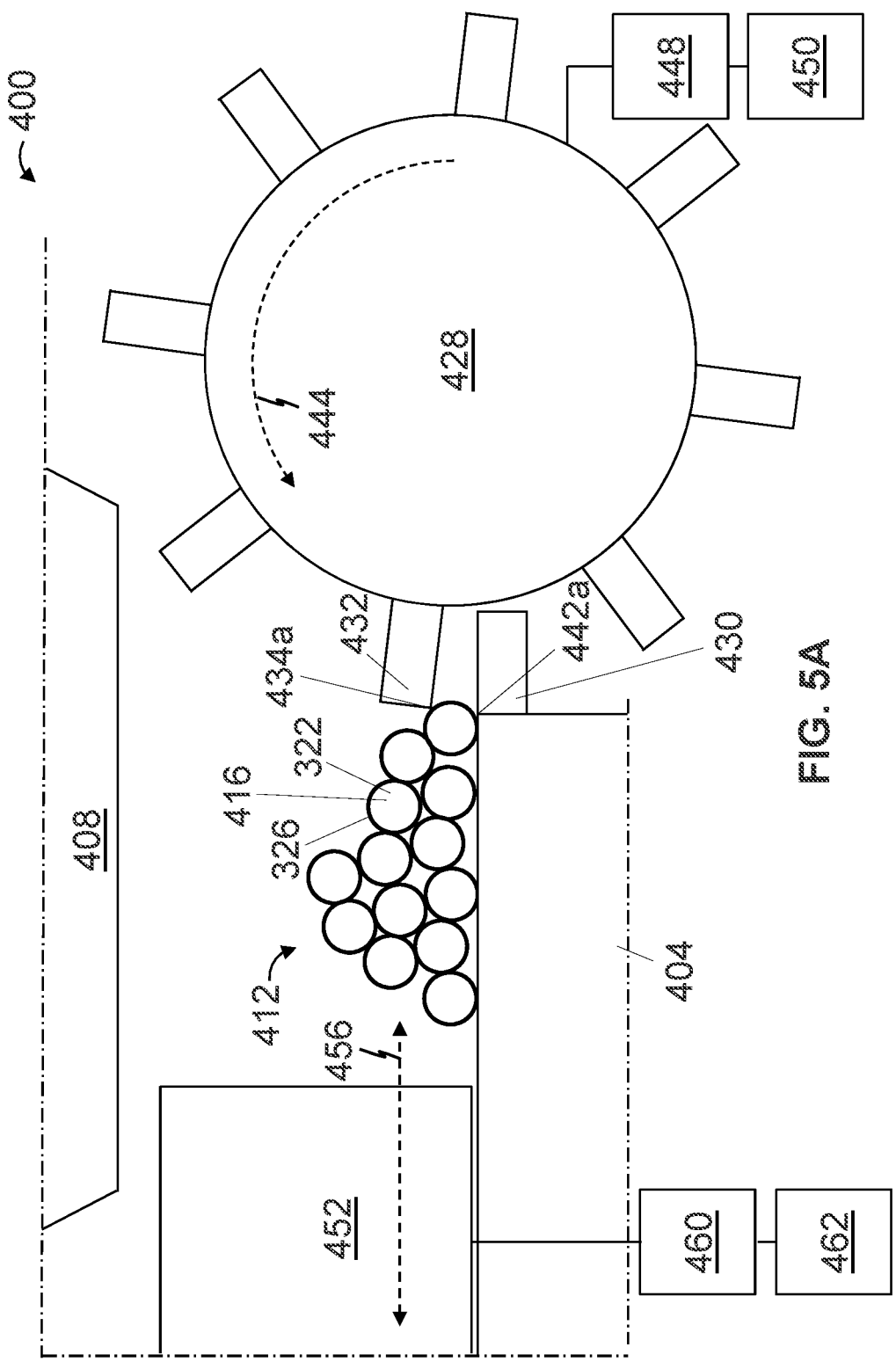
FIG. 5A is a diagram of a shredder, which may be suitable for use in some embodiments of the present disclosure.

FIG. 5A depicts a shredder 400, which may be suitable for use in some embodiments of the present disclosure (e.g., as a size-reducing machine 38, 94, and/or the like). Shredder 400 may include a bed 404 configured to receive an input feed of elements 412. As shown, bed 404 is substantially horizontal, or substantially parallel to the ground above which shredder 400 is disposed; however, in other embodiments, a bed (e.g., 404) of a shredder (e.g., 400) may be inclined, whether downwardly or upwardly, toward a rotor (e.g., 428) of the shredder, which may increase or decrease, respectively, a force that acts to move an element of an input feed of elements (e.g., 412) toward the rotor. Shredder 400 may include a hopper or chute 408 configured to receive input feed of elements 412 and provide the input feed of elements to bed 404 and/or rotor 428. More particularly, hopper or chute 408 may be configured to provide a majority of (e.g., up to and including all of) input feed of elements 412 to bed 404 (as opposed to directly to rotor 428); for example, the hopper or chute may be located such that at least a majority of an outlet of the hopper or chute is disposed (e.g., directly) above the bed. Shredder 400, by providing at least a majority of input feed of elements 412 to rotor 428 via bed 404, may be characterized as a side-fed shredder.

Input feed of elements 412 may have a maximum element size of 50 mm or greater (e.g., the input feed of elements may comprise a large-elements feed 34). Input feed of elements 412 may include branch sections 416 (including twigs), having bark 326 and wood fiber 322 (e.g., such as the branch sections depicted in FIG. 4A), and such branch sections may have maximum transverse dimensions (e.g., diameters) of from approximately 5 mm to approximately 45 mm and lengths up to or exceeding 100 mm.

Such branch sections (e.g., 416) may be particularly suited for wood fiber recovery. For example, bark (e.g., 326) of a branch section (e.g., 416) may be relatively thin and flexible (e.g., when compared to bark of a trunk section), facilitating peeling of the bark from the branch section in strips. For further example, a branch section (e.g., 416), due to its elongated structure, may have a tendency to orient itself relative to a rotor (e.g., 428) and/or a cutter bar (e.g., 430) of a shredder (e.g., 400) such that the long dimension of the branch section is generally parallel to a longitudinal axis of the rotor and/or cutter bar, thereby presenting bark (e.g., 326) on the exterior of the branch section to the rotor and/or cutter bar in a way that facilitates the rotor and/or cutter bar in peeling the bark from the branch section. Such branch sections (e.g., 416) (which may be characterized as "longs") may also tend to pass or ride over—rather than pass through—a filter (e.g., such as filter 18). Thus, by directing oversize elements or elements that fail to pass through a filter (e.g., 18) to a shredder (e.g., 400), branch sections (e.g., 416) that may be included in those elements can be peeled by the shredder, thereby enhancing system wood fiber recovery.

Figure 5B:
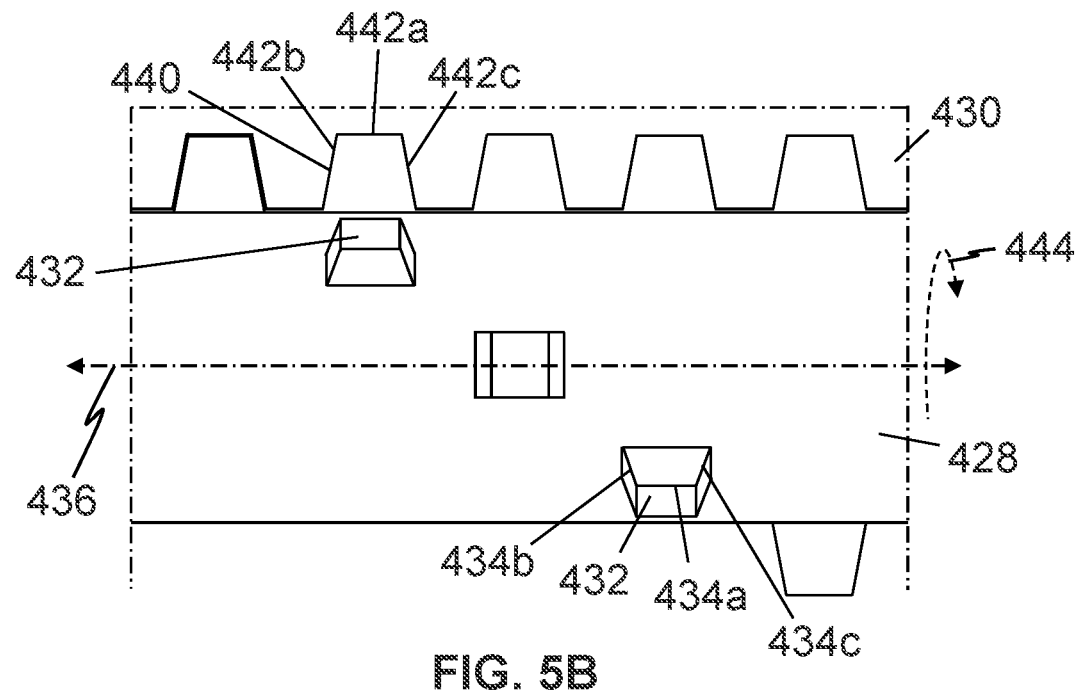
FIG. 5B is a top view of a rotor and a cutter bar of the shredder of FIG. 5A.

Shredder 400 may be configured to size-reduce input feed of elements 412, as well as remove bark 326 from branch sections 416 of the elements. For example, shredder 400 may comprise a frame (not shown) and a rotor 428 rotatably coupled to the frame and including a plurality of teeth 432. As shown in FIG. 5B, each tooth 432 may define a cutting edge 434*a* that is substantially parallel to a longitudinal axis 436 of rotor 428. Such a cutting edge (e.g., 434*a*) of a rotor (e.g., 428) tooth (e.g., 432) may, at least by being generally aligned with the long dimension of a branch section (e.g., 416) when the branch section is oriented relative to the rotor as described above, may facilitate the tooth in peeling bark (e.g., 326) from the exterior of the branch section. Each tooth 432 may define opposing cutting edges, 434b and 434c, that, though potentially substantially co-planar, are angularly disposed relative to one another and to longitudinal axis 436 of rotor 428. Cutting edge(s) (e.g., 434b and/or 434c) of a rotor (e.g., 428) tooth (e.g., 432) may, at least by being non-perpendicular to the long dimension of a branch section (e.g., 416) when the branch section is oriented relative to the rotor as described above, may facilitate the tooth in peeling bark (e.g., 326) from the exterior of the branch section. In other words, cutting edges 434a, 434b, and/or 434c may be configured to cut into a branch section (e.g., 316) along a line that is non-perpendicular to the long dimension of the branch section. Nevertheless, teeth (e.g., 432) of rotor (e.g., 428) may define any suitable cutting edge(s) (e.g., 434a, 434b, 434c, and/or the like), including those having curved, twisted, or helical portions.

Cutting edge 434a of a tooth 432 may be defined by two faces of the tooth that meet at a substantially 90 degree angle; for example, the tooth may have a longitudinal cross-section that is generally rectangular. In at least this way, a tooth (e.g., 432) may be facilitated in cutting or biting (e.g., downwardly) into a branch section (e.g., 416) to peel bark (e.g., 326) from the branch section and/or move the branch section against a cutter bar (e.g., 430) to peel bark from the branch section, while, for example, providing for a reduced depth of bite of the tooth on the branch section that might otherwise cause premature shredding of the branch section. In other embodiments, a tooth (e.g., 432) of a rotor (e.g., 428) can comprise any suitable shape, such as, for example, a shape having a cross-section that is generally triangular, trapezoidal, otherwise polygonal, circular, elliptical, and/or otherwise rounded. Shredder 400 may comprise a single rotor 428; however, in other embodiments, a shredder (e.g., 400) may include any suitable number of rotors (e.g., 428), such as, for example, 2, 3, 4, 5, or more rotors.

Figure 5C:
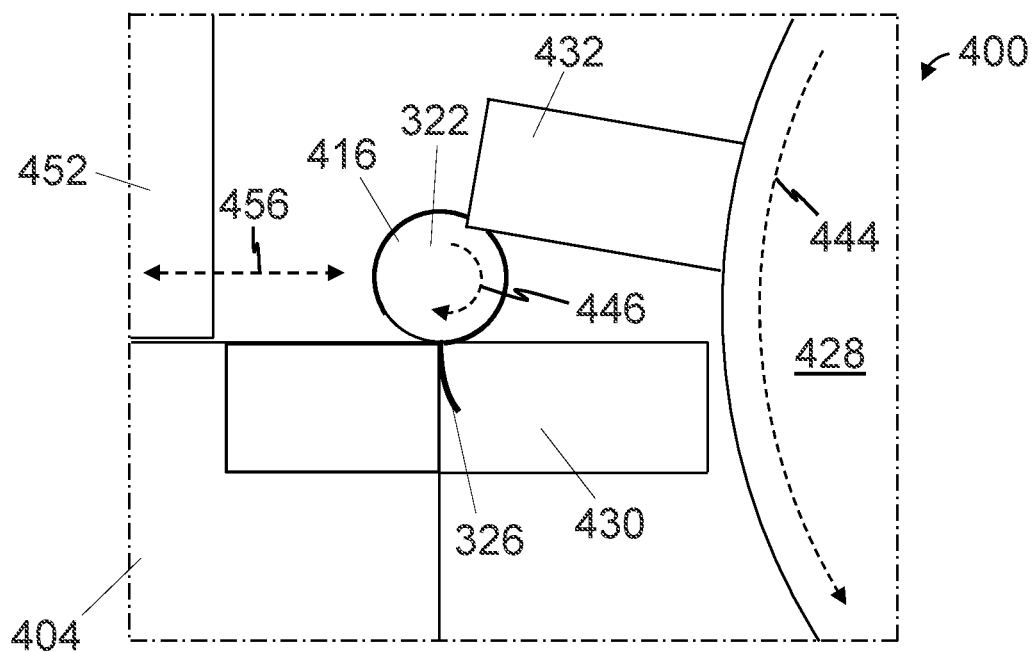
FIGS. 5C and 5D depict bark peeling and size reduction of a forest residue element, respectively, pursuant to some embodiments of the present disclosure.

Shredder 400 may comprise a cutter bar 430 coupled (e.g., in fixed relation relative) to the frame and defining a plurality of recesses 440, each configured to receive a respective one of teeth 432 during rotation of rotor 428 relative to the frame. As rotor 428 rotates, a branch section (e.g., 416) in contact with a tooth 432 of the rotor may rotate relative to cutter bar 430 (e.g., as shown in FIG. 5C, as rotor 428 rotates generally in a direction indicated by arrow 444, branch section 416 in contact with tooth 432 may rotate generally in a direction indicated by arrow 446) while being pressed against the cutter bar, facilitating the cutter bar in peeling bark (e.g., 326) from the exterior of the branch section. By way of example, cutter bar 430, within each recess 440, may define a cutting edge 442a that is substantially parallel to longitudinal axis 436 of rotor 428 and/or opposing cutting edges, 442b and 442c, that, though potentially substantially co-planar, are angularly disposed relative to one another and to the longitudinal axis of the rotor. Similarly to as described above for cutting edges 434a, 434b, and/or 434c of teeth 432, cutting edges 442a, 442b, and/or 442c of cutter bar 430 may facilitate the cutter bar in peeling bark (e.g., 326) from the exterior of a branch section (e.g., 316) (e.g., cutting edges 442a, 442b, and/or 442c may be configured to cut into a branch section 316 along a line that is non-perpendicular to the long dimension of the branch section). Nevertheless, a cutter bar 430 may define any suitable cutting edge(s) (e.g., 442a, 442b, 442c, and/or the like), including those having curved, twisted, or helical portions. A cutter bar (e.g., 430) and/or teeth (e.g., 432) of a shredder (e.g., 400) may be replaceable (e.g., when the cutter bar cutting edge(s) and/or teeth become too dull to effectively peel bark 326 from branch sections 316).

Shredder 400 may include a motor or engine 448 (e.g., an electric, hydraulic, internal combustion, and/or the like motor or engine) operatively coupled to and configured to rotate rotor 428 (e.g., generally along a direction indicated by arrow 444). Rotor 428 may be configured to rotate, or may be desirably operated, at a rotational speed of between 50 revolutions per minute (rpm) and 250 rpm, such as, for example, at a rotational speed of approximately 100 rpm. Such a relatively low rotational speed of rotor 428 may encourage teeth 432 and/or cutter bar 430 to peel bark 326 from branch sections 416, as opposed to (e.g., prematurely) chipping or fragmenting the branch sections.

In some embodiments (e.g., 400), a rotational speed of a rotor (e.g., rotor 428, in a direction generally indicated by arrow 444) may be adjustable. For example, a shredder (e.g., 400) may include a processor (e.g., 450) configured to control a speed of a motor or engine (e.g., 448) operatively coupled to a rotor (e.g., 428) and thus a rotational speed of the rotor. A processor (e.g., 450) may be configured to control rotational speed of a rotor (e.g., 428) based, at least in part, on data captured by one or more sensors, such as, for example, a speed sensor configured to capture data indicative of a rotational speed of the rotor, a load sensor configured to capture data indicative of a torque acting on the rotor, and/or the like.

Shredder 400 may include a pusher 452 configured to urge elements of input feed of elements 412 along bed 404 and toward and/or past rotor 428. For example, pusher 452 may be disposed above and may be movable (e.g., in a direction generally indicated by arrow 456) relative to bed 404 such that, as pusher 452 moves relative to the bed toward rotor 428, elements of input feed of elements 412 on the bed are urged by the pusher and toward and/or past the rotor. Pusher 452 may facilitate orientation of a branch section 416 such that the long dimension of the branch section is generally parallel to a longitudinal axis of rotor 428 and/or cutter bar 430, and/or, as described in more detail below, introduction of the branch section to teeth 432 of the rotor (e.g., for peeling of bark from the branch section), movement of the branch section past the rotor (e.g., for size reduction of the branch section), and/or the like.

Shredder 400 may include a motor or engine 460 operatively coupled to and configured to reciprocally move pusher 452 toward and away from rotor 428. Pusher(s) (e.g., 452) of the present shredders (e.g., 400) may operate at any suitable stroke length (e.g., a distance the pusher moves in a given stroke between a first position in which the pusher is furthest from rotor 428 and a second position in which the pusher is closest to the rotor), which may vary between successive strokes, and at any suitable speed (e.g., quantifiable in strokes per minute (spm)). For example, pusher 452 may be configured to operate at, or may be desirably operated at, a speed of approximately 10 spm and a stroke length of approximately 50 mm, and, periodically (e.g., every 2 to 5 minutes), a stroke length of 200 mm (e.g., to clear bed 404 of input feed of elements 412).

In some embodiments, a shredder (e.g., 400) may include a processor (e.g., 462) configured to control a speed or direction of a motor or engine (e.g., 460) operatively coupled to a pusher (e.g., 452) and thus a stroke length or a speed of the pusher. For example, a processor (e.g., 462) may be configured to control a stroke length or a speed of a pusher (e.g., 452) based, at least in part, on data captured by one or more sensors, such as, for example, a displacement sensor configured to capture data indicative of a position of the pusher, a speed sensor configured to capture data indicative of a speed of the pusher, a load sensor configured to capture data indicative of a load acting on the pusher, a load sensor configured to capture data indicative of a weight of elements acting on a bed (e.g., 404), and/or the like. A motor or engine (e.g., 460) operatively coupled to a pusher (e.g., 452) may be the same as a motor or engine (e.g., 448) operatively coupled to a rotor (e.g., 428), such as, for example, in embodiments where rotation of the rotor and displacement of the pusher are mechanically linked. A processor (e.g., 462) configured to control displacement of a pusher (e.g., 452) may be the same as a processor (e.g., 450) configured to control a rotational speed of a rotor (e.g., 428).

Figure 5D:
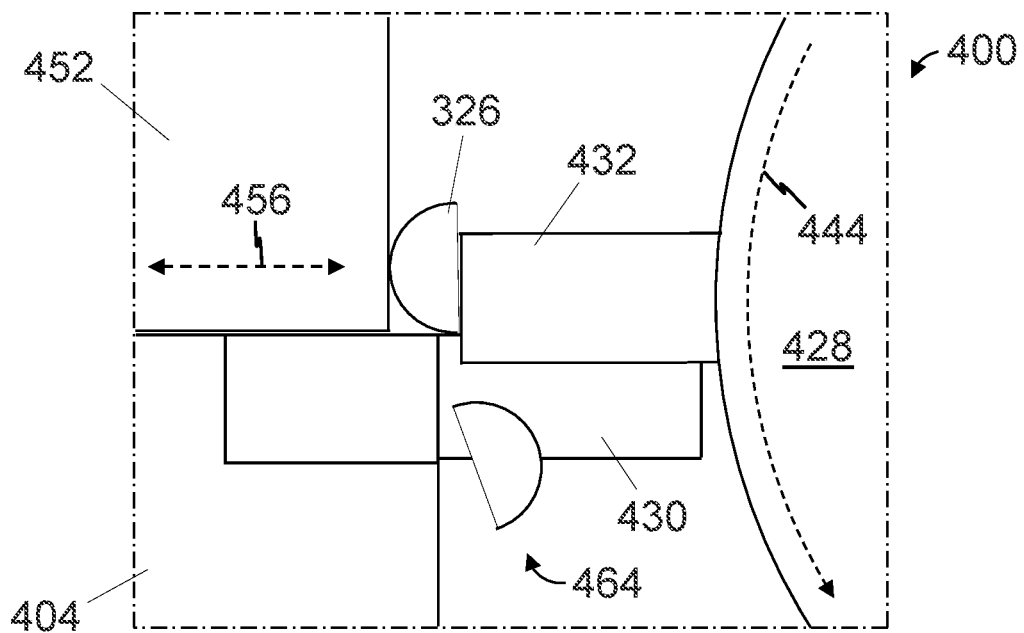

Referring additionally to FIGS. 5C and 5D, shown are examples of bark peeling (FIG. 5C) and size reduction (FIG. 5D) pursuant to some embodiments of the present disclosure (e.g., using shredder 400). As shown in FIG. 5C, a branch section 416 of input feed of elements 412 may be urged toward rotor 428 until a tooth 432 of the rotor contacts the branch section. Such urging may be accomplished by pusher 452, a force acting on the branch section that is provided by or through other elements of input feed of elements 412 (e.g., elements on top of the branch section, elements between the branch section and the pusher, elements on bed 404, elements in hopper or chute 308, and/or the like), an inclination of bed 404, and/or the like. Once the branch section contacts a tooth 432 of rotor 428, the tooth (e.g., cutting edges 434a, 434b, 434c, and/or the like) may peel bark 326 from the branch section and/or move the branch section against cutter bar 430 (e.g., cutting edges 442a, 442b, 442c, and/or the like) to peel bark from the branch section. Such peeling of bark 326 from the branch section may be facilitated by rotation of the branch section relative to cutter bar 430 (e.g., generally in a direction indicated by arrow 446), which may be unrestricted, at least by pusher 452. In some instances, during peeling of bark 326 from the branch section, pusher 452 may supply substantially no lateral force to the branch section; for example, the pusher may be out of contact with the branch section and/or other elements of input feed of elements 412 on bed 404 (e.g., to avoid moving the branch section past rotor 428 and thereby prematurely shredding the branch section). As shown in FIG. 5C, bark 326 peeled from the branch section may take the form of (e.g., generally tubular) strips.

As shown in FIG. 5D, once bark 326 has been peeled from the branch section, the branch section may be urged (e.g., via pusher 452, a force acting on the branch section that is provided by or through other elements of input feed of elements 412, an inclination of bed 404, and/or the like) past rotor 428, thereby size-reducing (e.g., shredding) the branch section. Bark 326 and wood fiber 322 may form at least a portion of an output feed of elements 464 from shredder 400. Output feed of elements 464 may have a maximum element size that is less than 50 mm (e.g., less than 40 mm).

For example, some embodiments of the present methods for debarking branch sections comprise receiving, with a shredder (e.g., 400), an input feed of elements (e.g., 412) including branch section (e.g., 416) having bark (e.g., 326) and wood fiber (e.g., 322), the shredder comprising a frame, a rotor (e.g., 428) rotatably coupled to the frame and including a plurality of teeth (e.g., 432), and a cutter bar (e.g., 430) coupled to the frame and defining a plurality of recesses (e.g., 440), each configured to receive a respective one of the teeth during rotation of the rotor relative to the frame, rotating the rotor relative to the frame at a rotational speed of between 50 rpm and 250 rpm, urging (e.g., directly or indirectly, with pusher 452) at least one of the branch sections toward the rotor until the branch section contacts at least one of the teeth of the rotor, peeling bark from the branch section with at least one of: the cutter bar and at least one of the teeth of the rotor, and urging (e.g., directly or indirectly, with pusher 452) the branch section past the rotor to reduce the size of the branch section with at least one of: the cutter bar and at least one of the teeth of the rotor. Some embodiments comprise allowing a period of time to elapse between urging the branch section toward the rotor and urging the branch section past the rotor.

In some embodiments, each tooth defines a cutting edge (e.g., 434a) that is substantially parallel to a longitudinal axis of the rotor. In some embodiments, each tooth defines opposing cutting edges (e.g., 434b and 434c) that are angularly disposed relative to one another and to a longitudinal axis of the rotor. In some embodiments, the shredder comprises a single rotor shredder.

In some embodiments, the cutter bar, within each recess, defines a cutting edge (e.g., 442a) that is substantially parallel to a longitudinal axis of the rotor. In some embodiments, the cutter bar, within each recess, defines opposing cutting edges (e.g., 442b and 442c) that are angularly disposed relative to one another and to a longitudinal axis of the rotor. In some embodiments, the cutter bar is coupled to the frame in fixed relation relative to the frame.

In some embodiments, the input feed of elements has a maximum element size of 50 mm or greater. In some embodiments, a majority of the branch sections have a maximum transverse dimension (e.g., diameter) of from approximately 5 mm to approximately 25 mm. Some embodiments comprise outputting, from the shredder, an output feed of elements (e.g., 464) including bark and wood fiber from at least a portion of the branch sections. In some embodiments, the output feed of elements has a maximum element size that is less than 50 mm. In some embodiments, the output feed of elements has a maximum element size that is less than 40 mm. Some embodiments comprise separating or sorting (e.g., with sorter 82 and/or 146) at least a portion of the output feed of elements into a wood fiber-elements feed (e.g., 86 and/or 150) and a bark-elements feed (e.g., 90 and/or 154) having a lower aggregate wood fiber content than that of the wood fiber-elements feed.

Returning to FIG. 2, system 10a may comprise a separator 46 configured to receive at least a portion of forest residue feed 14, such as at least a portion of large-elements feed 22 and/or at least a portion of small-elements feed 42, and separate the received portion into a high-areal-density-elements feed 50 and a low-areal-density-elements feed 54 having a lower maximum element areal density than that of the high-areal-density-elements feed.

For a two-dimensional object, the areal density, which may also be referred to as the area density, surface density, or superficial density, may be defined as the mass per unit area of the object. Similarly, as used in this disclosure, the areal density of an element may be defined as:

$$\rho_a = \frac{m}{A} \qquad (1)$$

where $\rho_a$ is the areal density of the element, m is the total mass of the element, and A is the total surface area of the element.

Lighter elements and/or elements having a substantially two-dimensional shape, such as, for example, needles, leaves, free portions of bark, and/or the like may have relatively low areal densities, and heavier elements, such as, for example, elements having relatively high wood fiber contents, may have relatively high areal densities. In at least this way, separator 46 may facilitate the removal of needles, leaves, free portions of bark, and/or the like from forest residue feed 14.

Figure 6:
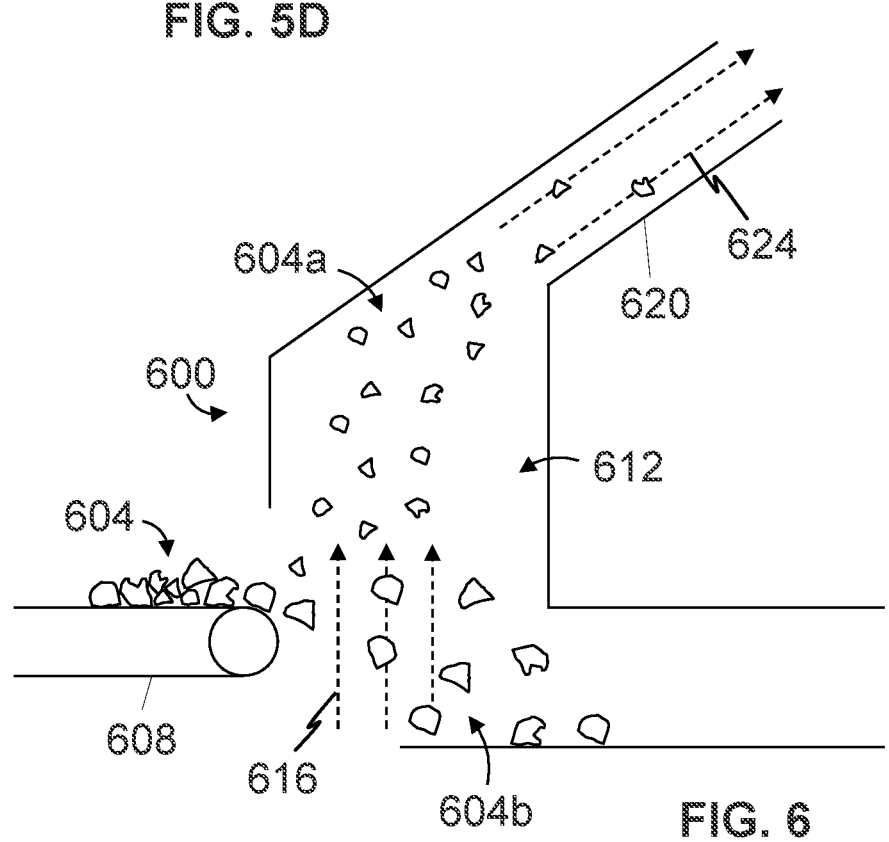
FIG. 6 is a diagram of an aerodynamic separator, which may be suitable for use in some embodiments of the present disclosure.
Figure 7A:
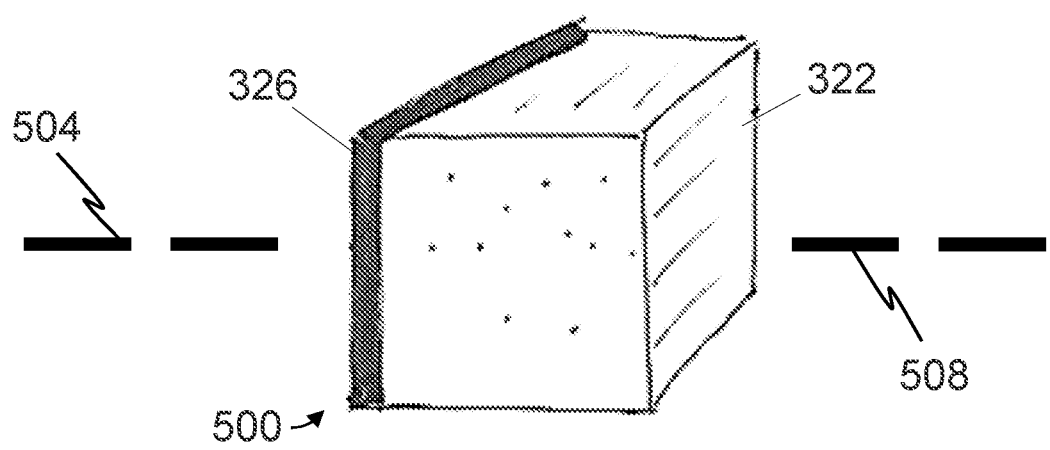
FIGS. 7A-7D depict optical sorting pursuant to some embodiments of the present disclosure.
Figure 7B:
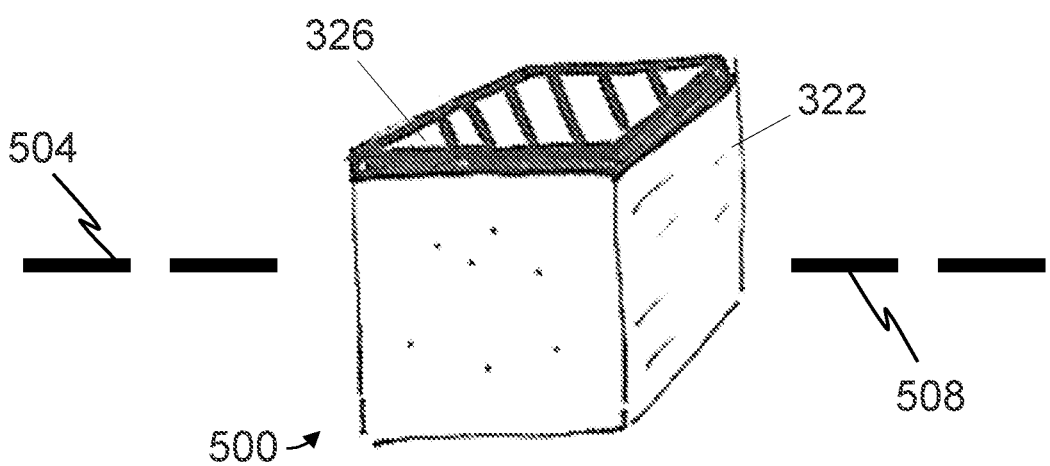
Figure 7C:
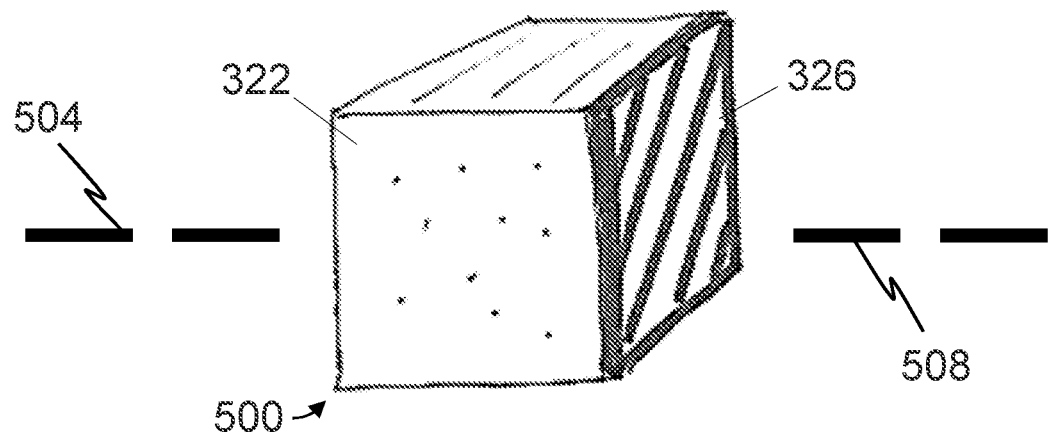
Figure 7D:
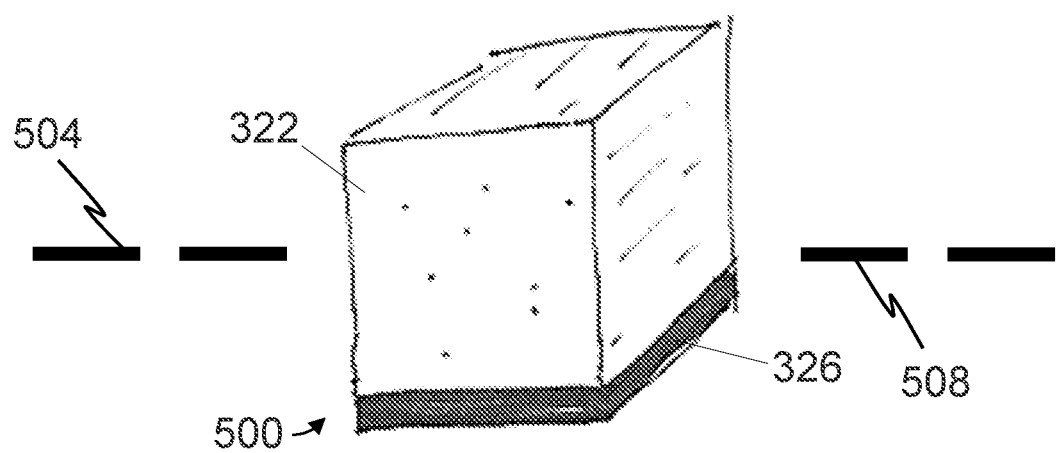

Separator 46 may comprise an aerodynamic separator (e.g., a windshifter separator, zigzag separator, and/or the like). For example, FIG. 6 depicts an aerodynamic separator 600, which may be suitable for use in some embodiments of the present disclosure. Separator 600 may be configured to receive an input feed of elements 604 (e.g., large-elements feed 22 and/or small-elements feed 42) via a conveyor 608. Conveyor 608 may be configured to move elements 604 along the conveyor at a sufficient speed such that, when the elements reach the end of the conveyor, the translational momentum of the elements carries (e.g., throws) them into the separator (e.g., into chamber 612). In other embodiments, an input feed of elements (e.g., 604) may be provided to a separator (e.g., 600) in any suitable fashion, such as, for example, via a chute, bed, and/or the like.

Separator 600 may include a chamber 612 and a fan, blower, and/or the like configured to generate a flow of air 616, which may be vortical (e.g., swirling), within the chamber. When elements 604 are exposed to flow of air 616, elements 604a that have lower areal densities may tend to move with the flow of air, and elements 604b that have higher areal densities may tend to resist moving with the flow of air, thereby separating elements having relatively low areal densities from those having relatively high areal densities. Elements 604a, assisted by flow of air 616, may be directed to an extraction duct 620, and elements 604b may avoid the extraction duct.

Separator 600 may be configured to generate a flow of air 624, which may be vortical, within extraction duct 620. Flow of air 624 may have a (e.g., significantly) higher velocity than flow of air 616, which may be provided by an additional fan, blower, and/or the like, extraction duct 620 having a smaller cross-sectional area than chamber 612, and/or the like. In this way, elements 604a may be moved within chamber 612 by flow of air 616 toward extraction duct 620, where flow of air 624 may facilitate passage of the elements through extraction duct 620. Separator 600 may include a filtration system configured to remove particulate matter, and/or the like from flow of air 616 and/or flow of air 624.

System 10a may comprise a separator 58 configured to receive at least a portion of forest residue feed 14, such as at least a portion of high-areal-density-elements feed 50, and separate the received portion into a high-density-elements feed 62 and a low-density-elements feed 66 having a lower maximum element density than that of the high-density-elements feed. For example, high-density elements feed 62 may comprise elements having densities of approximately 2,300-2,500 kg/m$^3$ (e.g., stones), and low-density-elements feed 66 may comprise elements having densities of approximately 250-1,250 kg/m$^3$, which may include elements having relatively high wood fiber contents (e.g., wood chips having densities of approximately 250-325 kg/m$^3$). In at least this way, separator 58 may facilitate removal of high-density elements, such as, for example, stones, from at least a portion of forest residue feed 14. A separator (e.g., 58) of the present systems may comprise any suitable separator, such as, for example, a de-stoner, a ballistic separator, an aerodynamic separator, and/or the like.

For example, separator 58 may comprise a liquid-based separator. To illustrate, an elements feed may be provided to a tank of liquid, such as, for example, water. Once in the tank, elements having relatively high densities, such as, for example, stones, may tend to sink in the liquid, and elements having relatively low densities, such as, for example, elements having relatively high wood fiber contents, may tend to float in the liquid, thereby separating the relatively high density elements from the relatively low density elements. In embodiments including such a liquid-based separator, the liquid-based separator may be configured to receive a high-density portion of an elements feed that has been density-separated by a non-liquid-based separator (e.g., in system 10a, separator 58 may be a non-liquid-based separator, and separator 70 may be a liquid-based separator), which may reduce an amount of the elements feed that is exposed to moisture by the liquid-based separator.

For further example, a separator 58 may comprise an aerodynamic separator. To demonstrate, TABLE 2 provides illustrative densities for elements that may be present in a forest residue feed (e.g., 14).

TABLE 2

Illustrative Element Densities

| Element | Density (kg/m$^3$) |
|---|---|
| Stone | 2300 |
| Type 1 Forest Residue | 250 |
| Type 2 Forest Residue | 325 |

Assuming a spherical shape having a diameter of 8 mm and the density provided in TABLE 2, a stone would have a maximum cross-sectional area of approximately 50.3 mm$^2$ and a weight of approximately 0.62 grams. As shown in TABLE 3, to have a substantially similar weight as such a stone, again assuming a spherical shape and the densities provided above, an element of type 1 forest residue would have a diameter of approximately 16.8 mm and a maximum cross-sectional area of approximately 221.7 mm$^2$, and an element of type 2 forest residue would have a diameter of approximately 15.4 mm and a maximum cross-sectional area of approximately 186.3 mm$^2$.

TABLE 3

Illustrative Diameters and Maximum Cross-sectional Areas of Spherical Elements of Substantially Similar Weight

| Element | Diameter (mm) | Maximum Cross-sectional Area (mm$^2$) |
|---|---|---|
| Stones | 8.0 | 50.3 |
| Type 1 Forest Residue | 16.8 | 221.7 |
| Type 2 Forest Residue | 15.4 | 186.3 |

As illustrated above, a spherical element of relatively dense type 2 forest residue may have a maximum cross-sectional area that is approximately 3.7 times a maximum cross-sectional area of a spherical stone having a substantially similar weight, and, in reality, an element of forest residue (whether type 1 or type 2) is likely to have an irregular shape, which may provide for an even larger maximum cross-sectional area. Thus, even a relatively dense element of forest residue may have a significantly larger cross-sectional area over which a flow of air may act to move the element than a high-density element, such as a stone, which may render such elements suitable for aerodynamic separation.

In embodiments including an aerodynamic separator configured to remove high-density elements, such as stones, from at least a portion of a forest residue feed (e.g., 14), the aerodynamic separator may be substantially similar to an aerodynamic separator described above for separator 46, but may operate at higher air flow (e.g., 616 and/or 624) velocities. In other embodiments, such an aerodynamic separator may comprise a slot or opening through which a flow of air may be directed. An elements feed may be directed over the slot or opening, whereby elements having relatively high densities, such as, for example, stones, may tend to fall through the slot or opening, and elements having relatively low densities, such as, for example, elements having relatively high wood fiber contents, may tend to pass over the slot or opening (e.g., assisted by the flow of air and/or translational momentum of the elements). The flow rate of air flow through the slot or opening may be adjusted to influence which elements tend to fall through the slot or opening and which elements tend to pass over the slot or opening (e.g., higher flow rates may allow for higher density elements to pass over the slot or opening than lower flow rates). In embodiments including two or more aerodynamic separators, the aerodynamic separators may share a fan, blower, filtration system, ducting, and/or the like.

System 10a may comprise an optional separator 70 configured to receive at least a portion of high-density-elements feed 62 and separate the received portion into a high-density-elements feed 74 and a low-density-elements feed 78 having a lower maximum element density than that of high-density-elements feed 62. At least a portion of high-density-elements feed 74 may be provided to a first store 114 (described in more detail below), and at least a portion of low-density-elements feed 78 may be provided to sorter 82. In at least this way, separator 70 may facilitate recovery of wood fiber from elements in high-density-elements feed 62, which, in some instances, may have an aggregate wood fiber content as high as 80%. In other embodiments, a high-density-elements feed (e.g., 62 and/or 74) may be at least partially provided as granular materials (e.g., 30), to a second store (e.g., 116, described in more detail below), and/or to a hog fuel feed (e.g., 126). Separator 70 may be substantially similar to separator 58, but, if air-assisted or aerodynamic, may operate at higher airflow rates.

While, in system 10a, separator 58 and/or separator 70 may be located downstream of filter 18, and more particularly, downstream of separator 46, in other embodiments, a separator (e.g., 58) and/or a separator (e.g., 70) may be disposed at any suitable location. For example, a separator (e.g., 58) and/or a separator (e.g., 70) may be located upstream of a filter (e.g., 18) such that, for example, the separator(s) may facilitate removal of high-density elements (e.g., stones) from at least a portion of a forest residue feed (e.g., 14) (e.g., or from forest residue 310, at pre-processing stage(s) 308), prior to providing the forest residue feed to the filter.

System 10a may comprise a sorter 82 configured to receive at least a portion of forest residue feed 14, such as at least a portion of low-density-elements feed 66, at least a portion of low-density-elements feed 78, at least a portion of large-elements feed 106, and/or the like, and separate the received portion into a wood fiber-elements feed 86 and a bark-elements feed 90 having a lower aggregate wood fiber content than that of the wood fiber-elements feed. Wood fiber-elements feed 86 may comprise elements from, for example, inside of tree trunk or top sections as well as outside of tree trunk or top sections, branch and/or twig sections, and/or the like (e.g., where bark has been removed, for example, by mechanical processing, as described above). Bark-elements feed 90 may comprise portions of bark (e.g., whether free and/or attached, for example, to a branch section), along with twigs, pine cones, contaminants, and/or the like, which may not be desirable in wood fiber-elements feed 86.

For example, sorter 82 may comprise an optical sorter, such as, for example, a camera-based (e.g., including infrared and/or the like camera-based), laser-based, and/or the like optical sorter. To illustrate, elements having relatively high wood fiber contents may have differing properties (e.g., colors, surface textures, sizes, shapes, structural properties, and/or the like) than elements having relatively low wood fiber contents, and such differing properties may be perceptible in the electromagnetic spectrum. Sorter 82 may be configured to perceive such differing properties in order to separate feed elements having relatively high wood fiber contents from feed elements having relatively low wood fiber contents.

For example, wood fiber (e.g., which may be light brown or tan) may reflect more visible light than bark (e.g., which may be dark brown or dark grey); accordingly, wood fiber may be described as 'light' and bark may be described as 'dark.' Thus, 'light' and 'dark' are one example of a relative characteristic that may be used to differentiate bark from wood fiber in a given feed of elements. For further example, a branch section, which may have bark as well as a substantial amount of recoverable wood fiber, may have a relatively long aspect ratio (e.g., around 3:1-5:1) when compared with other feed elements. Actual values for such relative characteristics may be determined experimentally to achieve desired separation of a given feed of elements, as these values may differ depending on, for example, the type of forest residue in the feed of elements.

Sorter 82 may comprise any suitable number of sensor(s) (e.g., cameras), and such sensor(s) may be arranged in any suitable configuration. For example, as shown in FIGS. 7A-7D, sorter 82 may be configured to capture data indicative of the wood fiber content of an element 500 from at least two opposing sides of the element. To illustrate, sorter 82 may comprise a first sensor having a first line-of-sight 504 and a second sensor having a second line-of-sight 508, where the second line-of-sight may be generally opposite to the first line-of-sight. Thus, in a variety of orientations of element 500 relative to sorter 82, at least one sensor of the sorter may be capable of detecting bark 326 on the element. In at least this way, incorrect determinations of the wood fiber content of element 500 due to the orientation of the element relative to sorter 82 may be reduced.

Sorter 82 may be configured to perform a two-way sort; elements substantially comprised of wood fiber may be directed to wood fiber-elements feed 86 and other elements may be directed to bark-elements feed 90 (e.g., for further processing). To illustrate, an element that is more than 5% dark (e.g., as indicated in data captured by at least one sensor of sorter 82) may be directed to bark-elements feed 90 and other elements may be directed to wood fiber-elements feed 86. Sorter 82 may be configured to perform a three-way sort; elements substantially comprised of wood fiber may be directed to wood-fiber elements feed 86, elements substantially comprised of bark may be rejected (e.g., directed to hog fuel feed 126), and other elements may be directed to bark-elements feed 90. To illustrate, an element that is 95% or more dark (e.g., as indicated in data captured by at least one sensor of sorter 82) may be rejected (e.g., directed to hog fuel feed 126), an element that is less than 95% dark but more than 5% dark may be directed to bark-elements feed 90

(e.g., for further processing), and other elements may be directed to wood fiber-elements feed 86. In some embodiments, branch sections may be identified, for example, based on a shape-based sorting criteria, and directed to bark-elements feed 90 (e.g., for further processing) (e.g., notwithstanding that such branch sections may be 95% or more dark). Such three-way sorting may reduce a number of elements that are directed to bark-elements feed 90 (e.g., for further processing).

Data captured by two or more sensors of sorter 82 regarding an element may be considered and/or combined (e.g., by a processor) to make a sorting decision regarding the element. To illustrate, elements that are 95% or more dark as indicated in data captured by two or more sensors may be rejected (e.g., directed to a hog fuel feed 126), elements that are 95% or more light as indicated in data captured by two or more sensors may be directed to wood fiber-elements feed 86, and other elements may be directed to bark-elements feed 90 (e.g., for further processing). Such an approach may be particularly advantageous when sorting elements comprising significant amounts of bark and wood fiber (e.g., branch sections, wood chips with bark attached, and/or the like), as, when considering data captured by an individual sensor, such elements may appear to be substantially comprised of bark (e.g., and may otherwise be rejected).

Sorter 82 may be configured to identify foreign objects (e.g., objects that comprise neither bark nor wood fiber), such as, for example, leaves, soda can tabs, other refuse, and/or the like. A foreign object may be identified when it meets a specified criteria (e.g., based on color, surface texture, size, shape, structural properties, and/or the like), when it fails to meet other sorting criteria (e.g., light, dark, and/or the like), and/or the like.

System 10a may include a (e.g., second) size-reducing machine 94 configured to size-reduce at least a portion of forest residue feed 14. For example, size-reducing machine 94 may be configured to receive at least a portion of bark-elements feed 90 and to produce a small-elements feed 98 having a maximum element size that is smaller than a maximum element size of the bark-elements feed. The maximum element size of bark-elements feed 90 may be approximately 50 mm, and the maximum element size of small-elements feed 98 may be approximately 25 mm. Similarly to as described above, size reduction of bark-elements feed 90 may liberate bark from wood fiber in elements of the bark-elements feed. Size-reducing machine 94 may comprise a shredder, such as, for example, a low-speed shredder. However, a size-reducing machine (e.g., 94) may comprise any suitable size-reducing machine, such as, for example, a grinder, granulator, and/or the like.

System 10a may comprise a filter 102 configured to receive at least a portion of forest residue feed 14 and filter the at least a portion of the forest residue feed into various sub-feeds, each having a respective maximum element size. For example, filter 102 may be configured to receive at least a portion of bark-elements feed 90, such as at least a portion of small-elements feed 98, and filter the at least a portion of the bark-elements feed into a large-elements feed 106 and a small-elements feed 110 having a maximum element size that is smaller than the maximum element size of the large-elements feed. The maximum element size of small-elements feed 110 may be approximately 8 mm. Small-elements feed 110 may be provided to hog fuel feed 126. As described above, filters (e.g., 102) may comprise any suitable filter, such as, for example, a plurality of perforated or mesh screens, a flip-flop screen machine, a star screen separator, and/or the like.

In system 10a and similar systems, sorter 82, size-reducing machine 94, and/or filter 102 may form a process loop. For example, elements comprising bark may be directed from sorter 82 to size-reducing machine 94 (e.g., where bark may be removed from the elements), the elements may be directed to filter 102 (e.g., to remove relatively small ones of the elements, such as free portions of bark liberated by the size-reducing machine), and remaining ones of the elements may be returned to the sorter. In this process loop, elements may circulate until the elements are substantially bark-free and/or substantially all bark has been size-reduced and removed from the elements. In such systems, a maximum element size of a small-elements feed (e.g., 110) exiting the process loop via a filter (e.g., 102) may be varied (e.g., from approximately 8 mm to approximately 20 mm) to control an amount of elements in the process loop; for example, allowing larger elements to exit the process loop via the filter may result in less elements remaining in the process loop. Within any process loop of the present systems, a diverter may be placed to mitigate overflow of elements.

System 10a may comprise a diverter 130 configured to divert at least a portion of forest residue feed 14 away from other components of the system. Diverter 130 may be controlled to help ensure that components downstream of the diverter do not receive element feeds at a rate that exceeds the capacity of the components. For example, diverter 130 may be located upstream of separator 46 and/or separator 58, which may determine the maximum element feed rate supportable by system 10a.

Diverter 130 may be controlled to help ensure an adequate supply of hog fuel (e.g., hog fuel feed 126), to, for example, meet requirements of one or more wood driers. For example, diverter 130 may be located downstream of filter 18, such that, for example, granular materials 30 have been substantially removed from forest residue feed 14 before at least a portion of the forest residue feed is diverted for use as hog fuel (e.g., enhancing the quality of the hog fuel). For further example, if elements provided to hog fuel feed 126 from other sources (e.g., small-elements feed 26, low-areal-density-elements feed 54, small-elements feed 110, and/or the like) are inadequate to, for example, meet requirements of one or more wood driers, diverter 130 may be controlled to provide additional elements to the hog fuel feed.

System 10a may include a processor 138 (e.g., which may include one or more processors) configured to control components of the system (e.g., magnetic separator 16, filters 18 and/or 102, diverter 130, size-reducing machines 38 and/or 94, separators 46, 58, and/or 70, sorter 82, and/or the like) based, at least in part, on data captured by one or more sensors. As used herein, a "processor" encompasses a programmable logic controller. Such sensor(s) may include any suitable sensor, such as, for example, a sensor configured to capture data indicative of a flow rate (e.g., sensor 134), speed, moisture content (e.g., moisture analyzer 12), temperature, depth, level, and/or the like of elements in an elements feed and/or within a component, a depth or level of elements in a store (e.g., 114, 116, 120, 122, and/or the like), within and/or awaiting processing by a component (e.g., on a conveyor and/or bed), and/or the like, a component operating parameter (e.g., a speed of a moving part such as a conveyor, a rotational speed of a rotating part such as a motor, drum, rotor, fan, blower, and/or the like, a frequency of oscillation of a vibrating and/or oscillating part such as a vibrating and/or oscillating bed, screen, and/or the like, a speed, flow rate, and/or the like of a flow of air within the component, a power consumption, a temperature, and/or the like), and/or the like.

For example, processor 138 may be configured to receive data captured by sensor(s) indicative of a depth or level of elements within and/or awaiting processing by a component. If the data indicates that the depth or level of elements is nearing or exceeds a threshold (e.g., based on a capacity of the component), the processor may control a diverter (e.g., 130) to direct elements away from the component, control an upstream component to reduce an amount of elements output by the upstream component, reduce a flow rate of an elements feed upstream of the component, and/or the like. For further example, processor 130 may be configured to receive data indicative of a flow rate of elements in hog fuel feed 126 (e.g., from sensor(s) 134). If the data indicates that the flow rate of elements is nearing or is below a threshold flow rate (e.g., based on requirements of one or more wood driers), processor 138 may control a diverter (e.g., 130) to direct at least a portion of forest residue feed 14 to the hog fuel feed.

For yet further example, processor 138 may be configured to receive data captured by sensor(s) indicative of characteristics of forest residue to be processed (e.g., whether the forest residue is type 1, type 2, and/or the like) and to control components of system 10a in order to enhance wood fiber recovery from the forest residue based, at least in part, on the characteristics. To illustrate, processor 138 may be configured to receive data captured by moisture analyzer 12 indicative of a moisture content of at least a portion of forest residue feed 14 and to control, based at least in part on the data, components of system 10a in order to enhance wood fiber recovery from the forest residue feed. The moisture content of an elements feed may be a particularly useful characteristic to consider, as it may provide information regarding the density, needle/leaf content, and/or the like of the elements feed.

Illustrative system parameters that may be controllable by a processor (e.g., 138) include: (1) for a magnetic separator (e.g., 16), power provided to magnet(s), a rotational speed of a drum, and/or the like; (2) for a filter (e.g., 18 and/or 102), a frequency of oscillation of a vibrating and/or oscillating bed, screen, and/or the like; (3) for a size-reducing machine (e.g., 38 and/or 94), a speed of a rotor; (4) for an aerodynamic separator (e.g., 46, 58, 70, and/or the like), a speed of a fan, blower, and/or the like; (5) for a sorter (e.g., 82), air pressure provided to, actuation-related timing of, and/or the like an ejector, sorting criteria, and/or the like; (6) a speed of a conveyor, infeed belt, and/or the like of a component and/or between components; (7) air pressure of a compressor unit and/or the like; (8) temperature of a chiller unit and/or the like; and/or the like.

As one example, when data captured by moisture analyzer 12 indicates a higher moisture content of forest residue in at least a portion of forest residue feed 14, processor 138 may cause separator 46 to operate at a higher airflow (e.g., 616 and/or 624) velocity (e.g., via control of fan(s), blower(s), and/or the like of the separator) to, for example, compensate for an increased needle/leave content and/or density (e.g., weight) of the forest residue (e.g., and vice versa). As another example, when data captured by moisture analyzer 12 indicates a higher moisture content of forest residue in at least a portion of forest residue feed 14, processor 138 may command an increase in air pressure provided to ejector(s) of sorter 82, to, for example, compensate for increased density (e.g., weight) of the forest residue (e.g., and vice versa).

System 10a, when processing substantially type 1 forest residue, may be configured to provide the outputs indicated in TABLE 4, below.

TABLE 4

| System Outputs According to Some Embodiments | |
|---|---|
| Output | % |
| Wood fiber | 52% |
| Hog fuel | 42% |
| Granular materials (e.g., compost and/or top soil material) | 5.5% |
| High-density elements (e.g., stones) | 0.5 |

As shown in TABLE 4, system 10a may be used to recover 50% or more of an amount of forest residue as usable wood fiber and provide 40% or more of the amount of forest residue as hog fuel.

Figure 8:
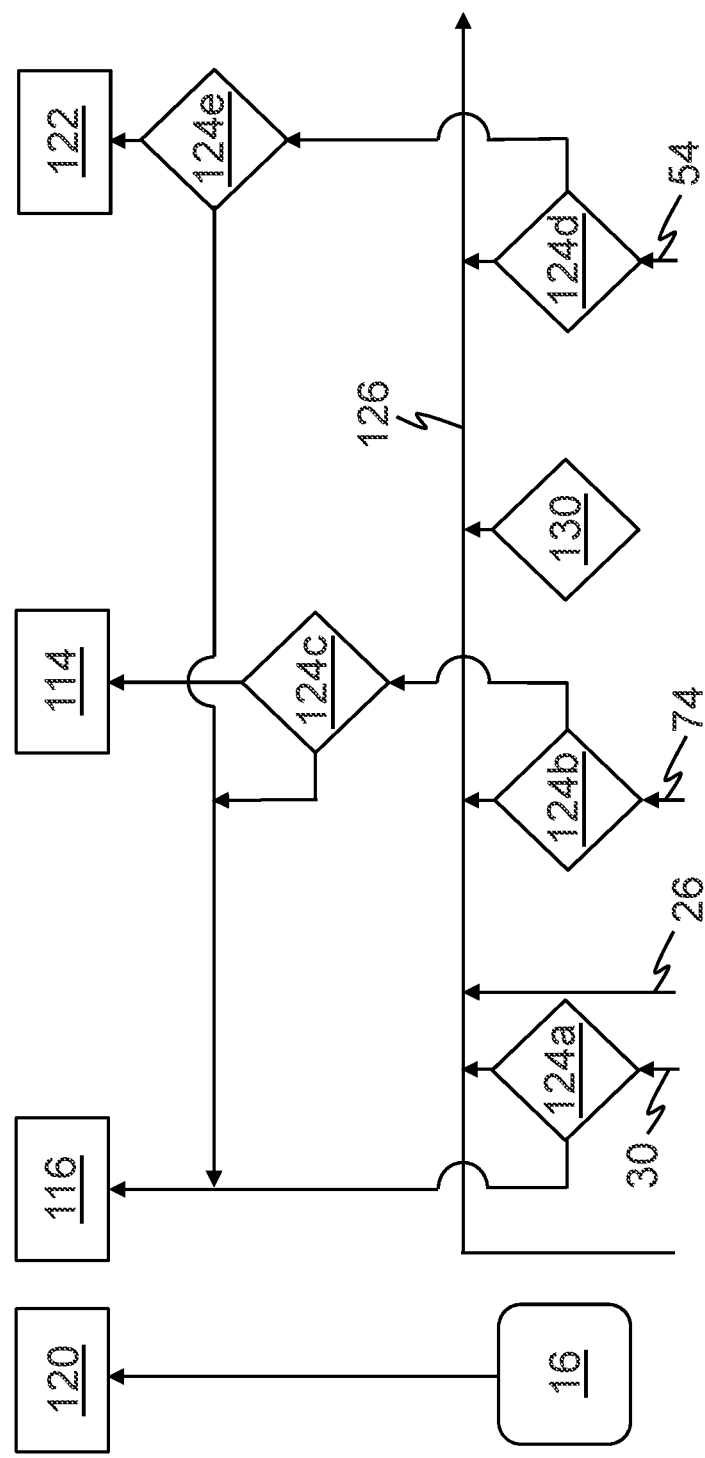
FIG. 8 is a diagram depicting outputs of some embodiments of the present disclosure as well as optional diverters for directing and/or combining the same.

FIG. 8 is a diagram depicting outputs of some embodiments of the present disclosure as well as optional diverters for directing and/or combining the same. As shown, the present systems may include: (1) a first store (e.g., 114) configured to receive high-density elements (e.g., stones) removed from a forest residue feed (e.g., 14); (2) a second store (e.g., 116) configured to receive granular materials (e.g., 30), high-density elements, low-areal-density elements (e.g., needles, leaves, free portions of bark, and/or the like), and/or the like removed from the forest residue feed (e.g., which may be suitable for use as a compost and/or top soil material); (3) a third store (e.g., 120) configured to receive ferromagnetic materials removed from the forest residue feed; and/or (4) a fourth store (e.g., 122) configured to receive low-areal-density elements removed from the forest residue feed (e.g., which may be suitable for use as a compost and/or mulch material). A store (e.g., 114, 116, 120, 122, and/or the like) may comprise a storage container, bin, dumpster, trailer, and/or the like, and may facilitate transportation, recycling, and/or disposal of elements contained by the store. Some embodiments may be configured to output bark (e.g., from bark-elements feed 90), which may be suitable for use as a mulch material.

The present systems may include diverter(s) (e.g., 124a-124e) configured to direct and/or combine system outputs as desired. For example, the present systems may include a diverter (e.g., 124a) configured to direct granular materials (e.g., 30) to a second store (e.g., 116) or for use as hog fuel (e.g., to hog fuel feed 126). For further example, the present systems may include a diverter (e.g., 124b and/or 124c) configured to direct high-density elements to a first store (e.g., 114), to a second store (e.g., 116), or for use as hog fuel. For yet further example, the present systems may include a diverter (e.g., 124d and/or 124e) configured to direct low-areal-density elements to a fourth store (e.g., 122), to a second store (e.g., 116), or for use as hog fuel. Such diverters (e.g., 124a-124e) may be operated based on an amount of hog fuel available from other sources, a desirability of compost, top soil, and/or mulch material and/or stones, and/or the like.

Figure 9:
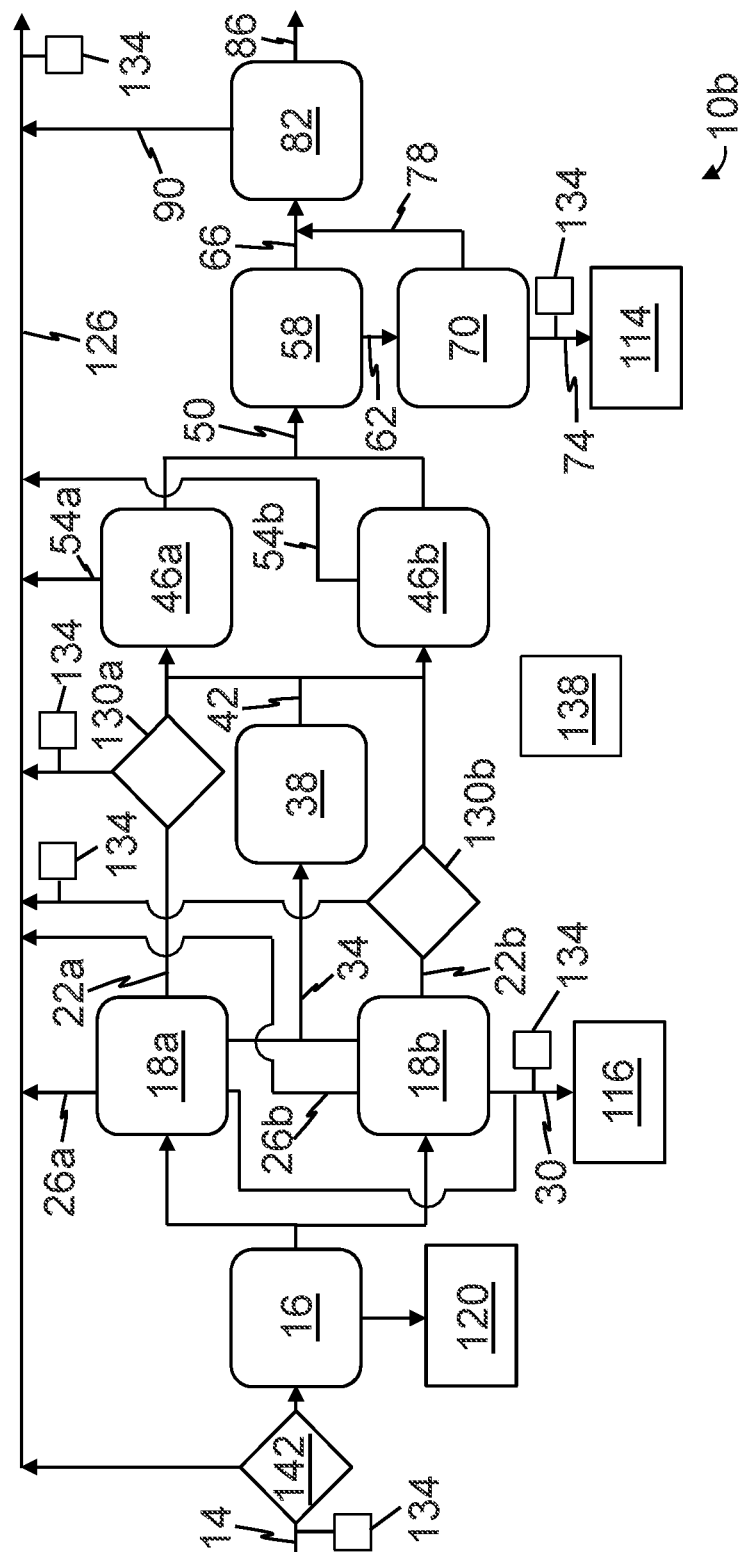
FIG. 9 is a diagram of a second embodiment of the present systems.

FIG. 9 is a diagram of a second embodiment 10b of the present systems. System 10b may be substantially similar to system 10a, with the primary exceptions described below. System 10b, as with other systems, may include one or more sets of two or more components, where the two or more components of each of the one or more sets are configured to operate in a parallel fashion. For example, system 10b may comprise a filter 18*a* and a filter 18*b*, each configured to receive at least a portion of forest residue feed 14 and filter the received portion into a large-elements feed 22*a* or a large-elements feed 22*b*, respectively, a small-elements feed 26*a* or a small-elements feed 26*b*, respectively, a large-elements feed 34, and/or granular materials 30. For further example, system 10*b* may comprise a separator 46*a* and a separator 46*b*, each configured to receive at least a portion of forest residue feed 14, such as at least a portion of large-elements feed 22*a* or at least a portion of large-elements feed 22*b*, respectively, and separate the received portion into a high-areal-density-elements feed 50 and a low-areal-density-elements feed 54*a* or a low-areal-density-elements feed 54*b*, respectively. For yet further example, system 10*b* may comprise a diverter 130*a* and a diverter 130*b*, each configured to divert at least a portion of forest residue feed 14, such as at least a portion of large-elements feed 22*a* or at least a portion of large-elements feed 22*b*, respectively, away from other components of system 10*b* (e.g., separator 46*a* or separator 46*b*, respectively, separator 58, separator 70, sorter 82, and/or the like) (e.g., and to hog fuel feed 126). In these ways and others, system 10*b* may allow for increased throughput, fault tolerance (e.g., system 10*b* may continue to function using filter 18*b* if filter 18*a* malfunctions, using separator 46*b* if separator 46*a* malfunctions, and/or the like), and/or the like.

As with other systems, system 10*b*, may comprise an optional system override diverter 142 configured to receive at least a portion of forest residue feed 14 and selectively (e.g., whether controlled manually and/or automatically, for example, by processor 138) divert the received portion away from other components of system 10*b* (e.g., and to hog fuel feed 126. Diverter 142 may be substantially similar to diverter 130 as described with respect to system 10*a*, with the primary exception that diverter 142 may be disposed upstream of filter 18. In at least this way, diverter 142 may be configured to divert at least a portion of forest residue feed 14 away from a majority of (e.g., up to and including all of) other components of system 10*b*, which may facilitate maintenance of system 10*b* and/or components thereof, mitigate the impact of malfunctions of system 10*b* and/or components thereof, control the rate of element feeds within system 10*b*, and/or the like.

While system 10*b* is shown without a size-reducing machine (e.g., 94) or filter (e.g., 102), such a size reducing machine and/or filter may nevertheless be present in other embodiments that are otherwise the same as or similar to system 10*b*.

Figure 10:
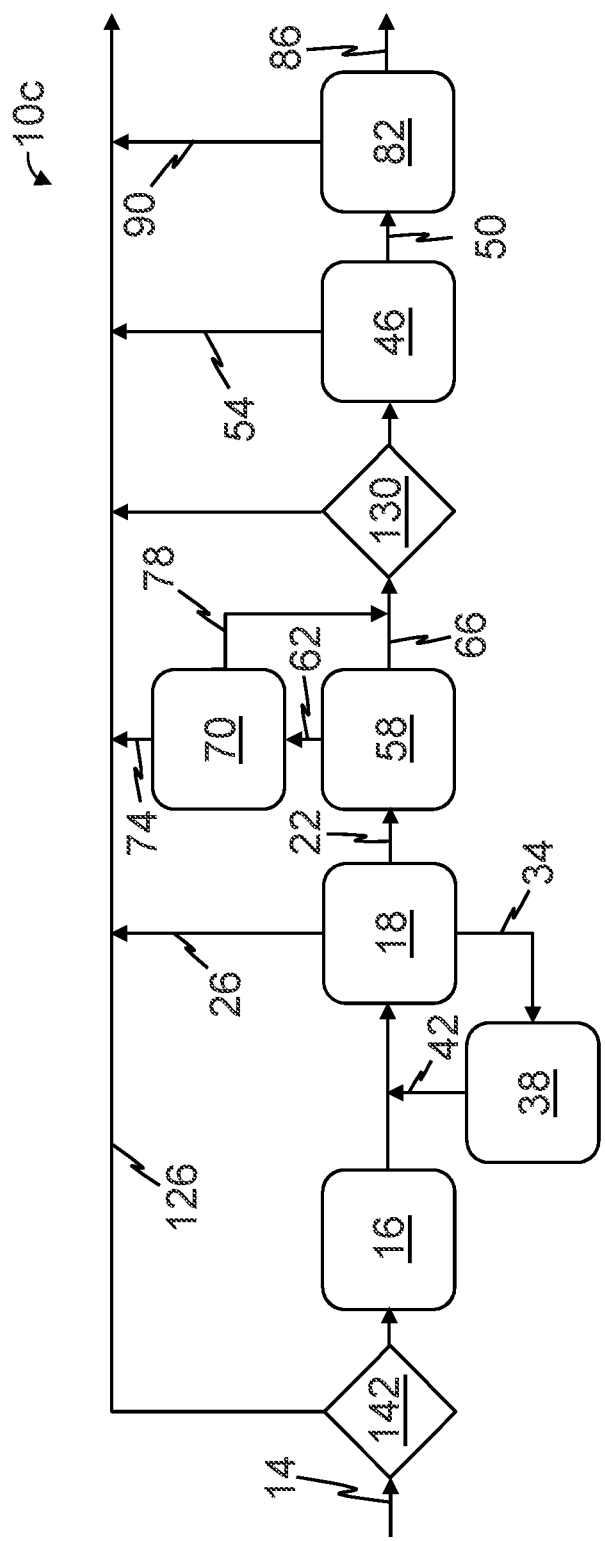
FIG. 10 is a diagram of a third embodiment of the present systems.

FIG. 10 is a diagram of a third embodiment 10*c* of the present systems. System 10*c* may be substantially similar to system 10*a*, with the primary exceptions described below. In system 10*c*, as with other systems, filter 18 may be configured to receive at least a portion of forest residue feed 14 and filter the received portion into large-elements feed 22, large-elements feed 34, and small-elements feed 26, which may include any granular materials 30. Granular materials 30 may have a sufficient calorific value (e.g., provided by portions of wood fiber, bark, needles, leaves, and/or the like within the granular materials) for use as hog fuel. Thus, by providing granular materials 30 to hog fuel feed 126 (e.g., within small-elements feed 26), system 10*c* may be configured to provide for increased hog fuel output.

As with other systems, in system 10*c*, as with other systems, filter 18 may be configured to receive and filter at least a portion of small-elements feed 42 provided by size-reducing machine 38. When elements are sized reduced, relatively small elements (e.g., having maximum element sizes of approximately 10 mm or less, including, for example, fines) may be produced from which wood fiber recovery may be ineffective and/or uneconomical. In system 10*c*, at least by using filter 18 to direct such relatively small elements within small-elements feed 42 away from other system components, such as, for example, separators 58, 70, and/or 46, diverter 130, sorter 82, and/or the like, load on those components may be reduced without undesirably decreasing wood fiber output from the system.

In system 10*c*, as with other systems, separator 46 may be configured to receive and separate at least a portion of low-density-elements feed 66 and/or low-density-elements feed 78 from separator 58 and/or separator 70 (e.g., separator 46 may be described as downstream of separator 58 and/or separator 70). At least a portion of high-density-elements feed 62 and/or high-density-elements feed 74 may be directed to hog fuel feed 126. During separation of high-density elements from an elements feed, elements comprising wood fiber and/or bark may be carried with the high-density elements (e.g., due to physical interactions between such elements). Thus, at least by directing a portion of high-density-elements feed 62 and/or high-density-elements feed 74 to hog fuel feed 126, system 10*c* may be configured to provide for increased hog fuel output.

System 10*c* may be configured to provide the outputs indicated in TABLE 5, below:

TABLE 5

System Outputs According to Some Embodiments

| Output | % |
|---|---|
| Wood fiber | 44% |
| Hog fuel | 56% |

Figure 11:
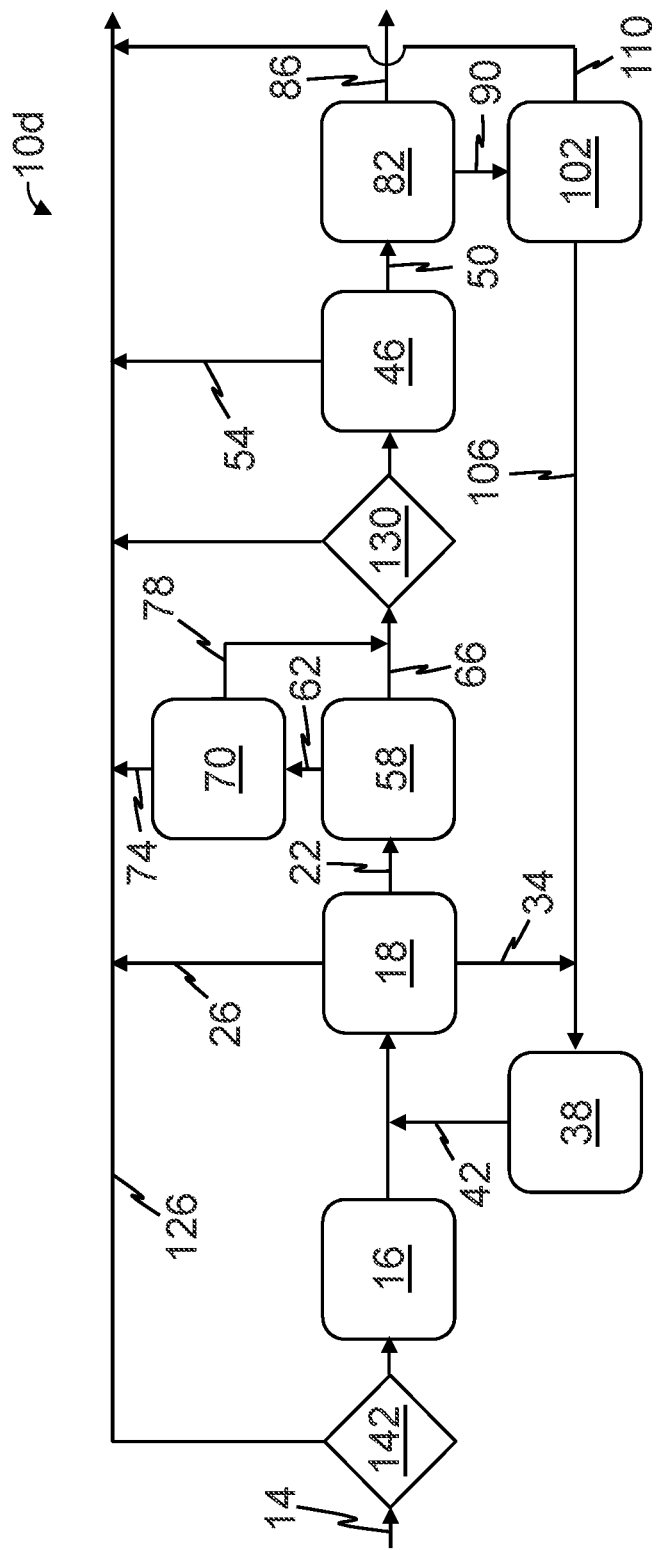
FIG. 11 is a diagram of a fourth embodiment of the present systems.

FIG. 11 is a diagram of a fourth embodiment 10*d* of the present systems. System 10*d* may be substantially similar to system 10*c*, with the primary exceptions described below. System 10*d*, as with other systems, may comprise a filter 102 configured to receive at least a portion of bark-elements feed 90 and filter the received portion into a large-elements feed 106 and a small-elements feed 110 having a maximum element size that is smaller than a maximum element size of the large-elements feed. For example, the maximum element size of small-elements feed 110 may be approximately 20 mm, and the maximum element size of large-elements feed 106 may be approximately 50 mm (e.g., filter 102 may include screens that define openings, each having a maximum transverse dimension of approximately 20 mm). Large-elements feed 106 may be provided to a size-reducing machine (e.g., 38) for size-reduction, which may liberate wood fiber from elements of the large-elements feed (e.g., thereby reprocessing elements including bark from bark-elements feed 90). In at least this way, system 10*c* may be configured to provide for increased system wood fiber output at a relatively small additional cost.

System 10*d* may be configured to provide the outputs indicated in TABLE 6, below:

TABLE 6

System Outputs According to Some Embodiments

| Output | % |
|---|---|
| Wood fiber | 57% |
| Hog fuel | 43% |

Figure 12:
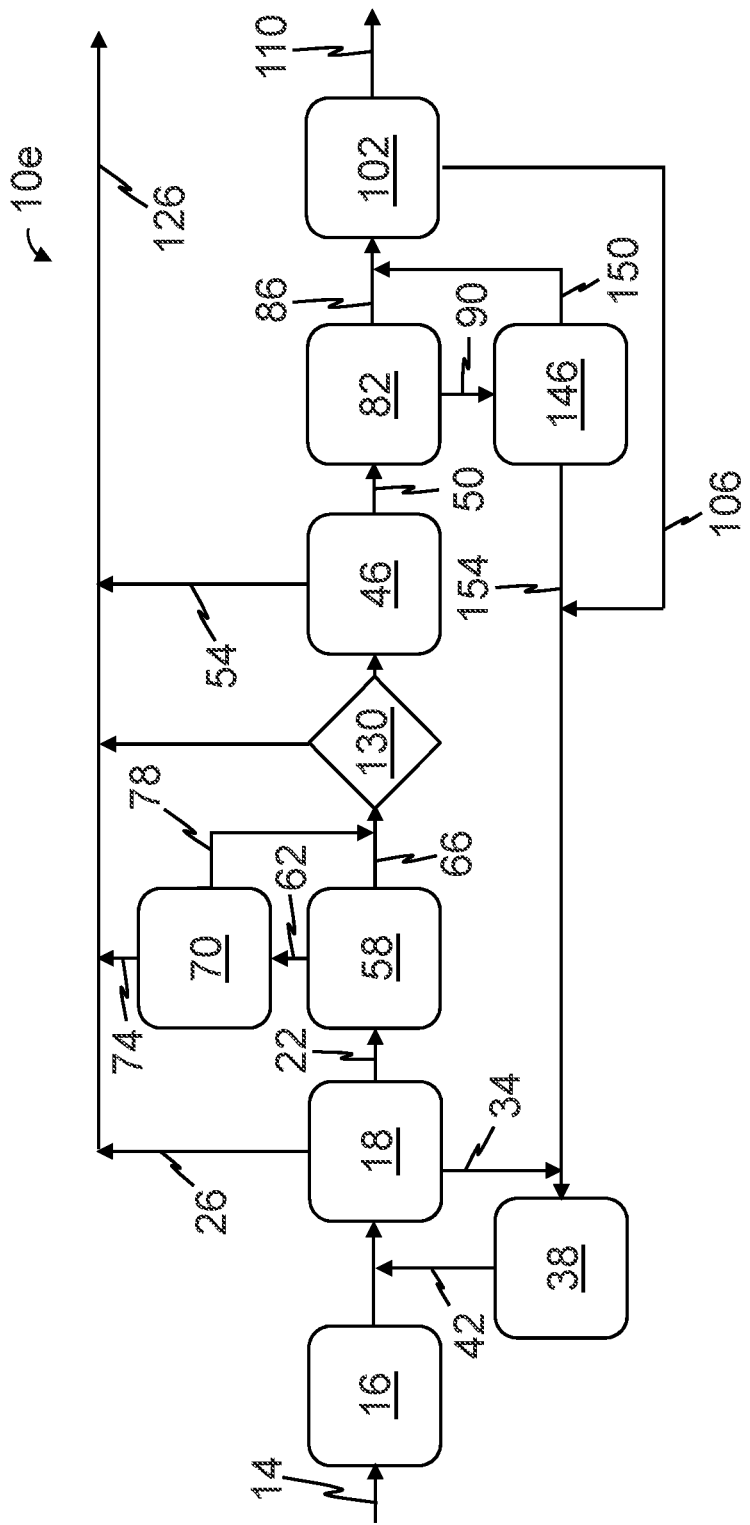
FIG. 12 is a diagram of a fifth embodiment of the present systems.

FIG. 12 is a diagram of a fifth embodiment 10*e* of the present systems. System 10*e* may be substantially similar to system 10*d*, with the primary exceptions described below. System 10*e*, as with other systems, may include a sorter 146 configured to receive at least a portion of bark-elements feed 90 and sort the received portion into a wood fiber-elements feed 150 and a bark-elements feed 154 having a lower aggregate wood fiber content than that of the wood fiber-elements feed. Sorter 146 may comprise any and/or all of the features described above with respect to sorter 82. At least a portion of bark-elements feed 154 may be provided to a size-reducing machine (e.g., 38) for size-reducing, which may liberate wood fiber from elements of the bark-elements feed. At least by allowing for recovery of wood fiber that may be present in bark-elements feed 90 and/or bark-elements feed 154 (which, in some instances, may not be insignificant) (e.g., by reprocessing elements including bark from those feed(s)), system 10*e* may be configured to provide for increased system wood fiber output.

As with other systems, system 10*e* may comprise a filter 102 configured to receive at least a portion of wood fiber-elements feed 86 and filter the received portion into a large-elements feed 106 and a small-elements feed 110 (e.g., which may be provided as wood fiber output from the system) having a maximum element size that is smaller than a maximum element size of the large-elements feed. By way of example, the maximum element size of small-elements feed 110 may be approximately 30 mm. Some embodiments including such a filter (e.g., 102) may include a size-reducing machine configured to size-reduce at least a portion of a large-elements feed (e.g., 106) before providing it back to the filter, thereby forming a process loop. In some embodiments, such a filter (e.g., 102) may be configured to filter at least a portion of a wood fiber-elements feed (e.g., 86) into an additional small-elements feed (e.g., which may be provided to hog fuel feed 126) having a maximum element size (e.g., of approximately 15 mm) that is smaller than the maximum element size of a small-elements feed (e.g., 110). In these ways and others, such embodiments may provide for control over element sizes in wood fiber output by the system.

System 10*e* may be configured to provide the outputs indicated in TABLE 7, below:

TABLE 7

System Outputs According to Some Embodiments

| Output | % |
|---|---|
| Wood fiber | 60% |
| Hog fuel | 40% |

Figure 13:
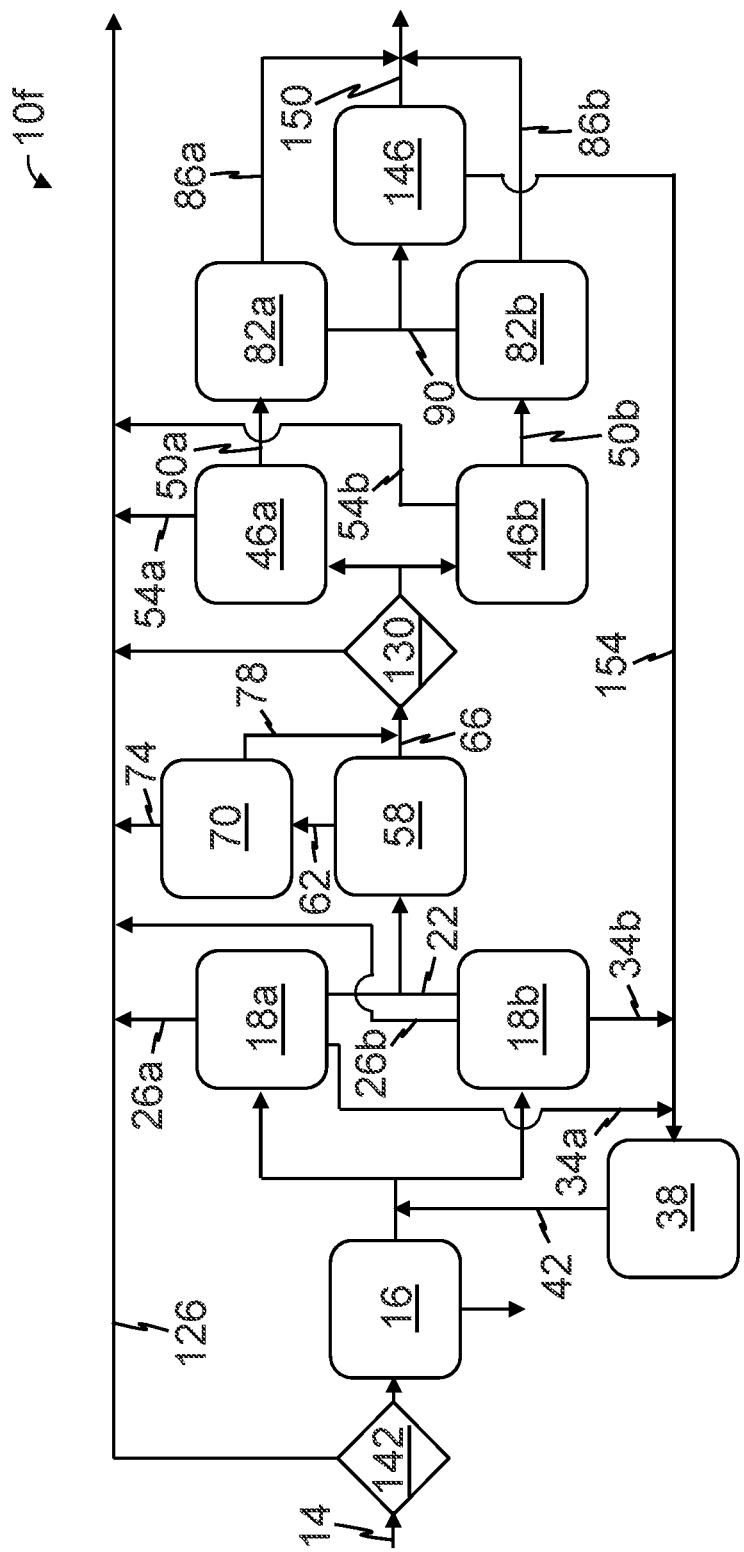
FIG. 13 is a diagram of a sixth embodiment of the present systems.

FIG. 13 is a diagram of a sixth embodiment 10*f* of the present systems. System 10*f* may be substantially similar to system 10*e*, with the primary exceptions described below. System 10*f*, as with other systems, may include one or more sets of two or more components, where the two or more components of each of the one or more sets are configured to operate in a parallel fashion. For example, system 10*f* may comprise a filter 18*a* and a filter 18*b*, each configured to receive at least a portion of forest residue feed 14 and filter the received portion into a large-elements feed 22, a small-elements feed 26*a* or a small-elements feed 26*b*, respectively, and a large-elements feed 34*a* or a large-elements feed 34*b*, respectively. For further example, system 10*f* may include a separator 46*a* and a separator 46*b*, each configured to receive at least a portion of forest residue feed 14, such as at least a portion of low-density-elements feed 66 and/or low-density-elements feed 78, and separate the received portion into a high-areal-density-elements feed 50*a* or a high-areal-density-elements feed 50*b*, respectively, and a low-areal-density-elements feed 54*a* or a low-areal-density-elements feed 54*b*, respectively. For yet further example, system 10*f* may include a sorter 82*a* and a sorter 82*b*, each configured to receive at least a portion of forest residue feed 14, such as at least a portion of high-areal-density-elements feed 50*a* or at least a portion of high-areal-density-elements feed 50*b*, respectively, and sort the received portions into a wood fiber-elements feed 86*a* or a wood fiber-elements feed 86*b*, respectively, and a bark-elements feed 90. In these ways and others, system 10*f* may allow for increased throughput, fault tolerance (e.g., system 10*f* may continue to function using filter 18*b* if filter 18*a* malfunctions, using separator 46*b* if separator 46*a* malfunctions, using sorter 82*b* if sorter 82*a* malfunctions, and/or the like), and/or the like.

Figure 14:
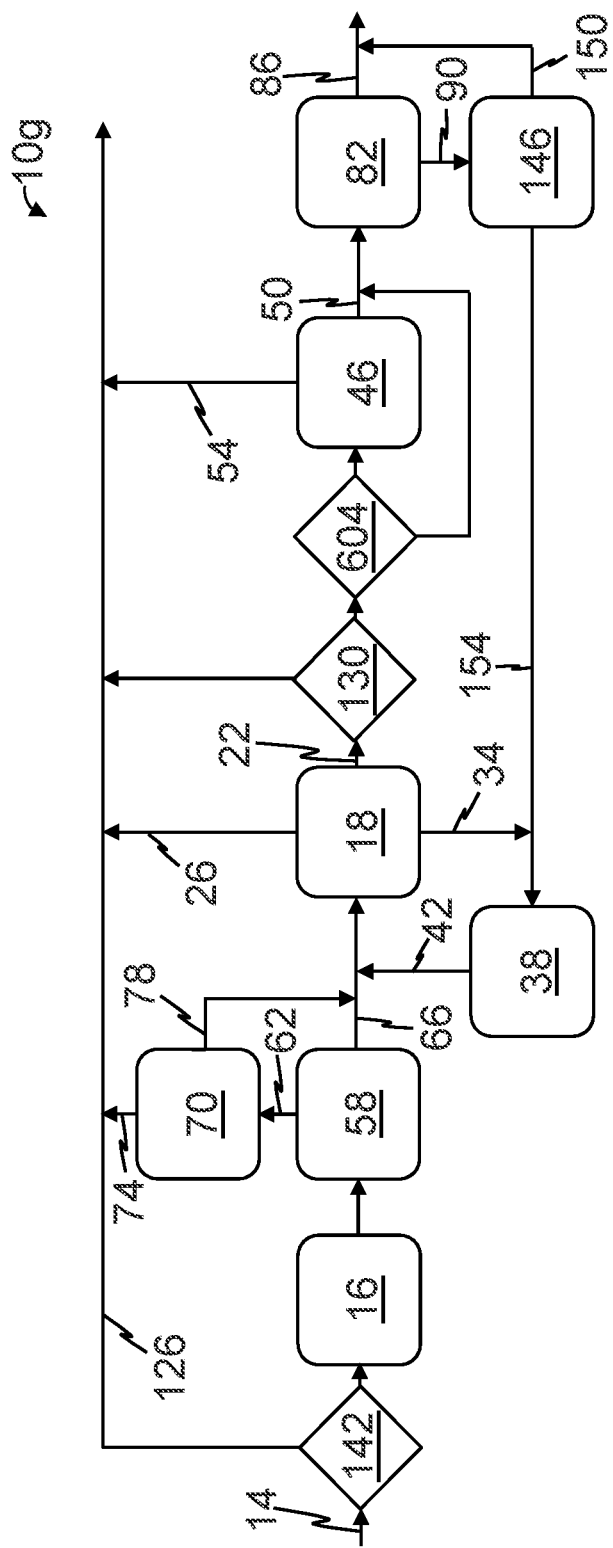
FIG. 14 is a diagram of a seventh embodiment of the present systems.

FIG. 14 is a diagram of a seventh embodiment 10*g* of the present systems. System 10*g* may be substantially similar to system 10*f*, with the primary exceptions described below. As with other systems, in system 10*g*, separator 58 and/or separator 70 may be disposed upstream of filter 18. For example, filter 18 may be configured to receive at least a portion of low-density-elements feed 66 and/or low-density-elements feed 78 and filter the received portion(s) into large-elements feed 22, small-elements feed 26, large-elements feed 34, granular materials 30, and/or the like. In at least this way, system 10*g* may allow for the removal of high-density elements, such as stones, from at least a portion of forest residue feed 14 before the forest residue feed is received by filter 18, which may render system 10*g* particularly suited for processing forest residue that includes a relatively large proportion of stones, such as forest residue derived from stumps.

System 10*g*, as with other systems, may include an optional diverter 604 configured to selectively divert at least a portion of forest residue feed 14, such as at least a portion of large-elements feed 22, away from separator 46, such that the diverted portion may bypass the separator. Separator 46, which is configured to separate elements based on areal density, may be less effective at separating forest residue elements that include little to no low-areal-density elements (e.g., needles, leaves, and/or the like), such as, for example, forest residue elements derived from stumps. When processing such forest residue elements, diverter 604 may be controlled to allow such elements to bypass separator 46, and when processing other forest residue elements (that include a non-insignificant amount of low-areal-density-elements), the diverter may be controlled to direct such other elements to the separator, thereby maximizing process efficiency, minimizing wear on the separator, and/or the like. In some systems, a separator (e.g., 46) may be omitted.

Figure 15:
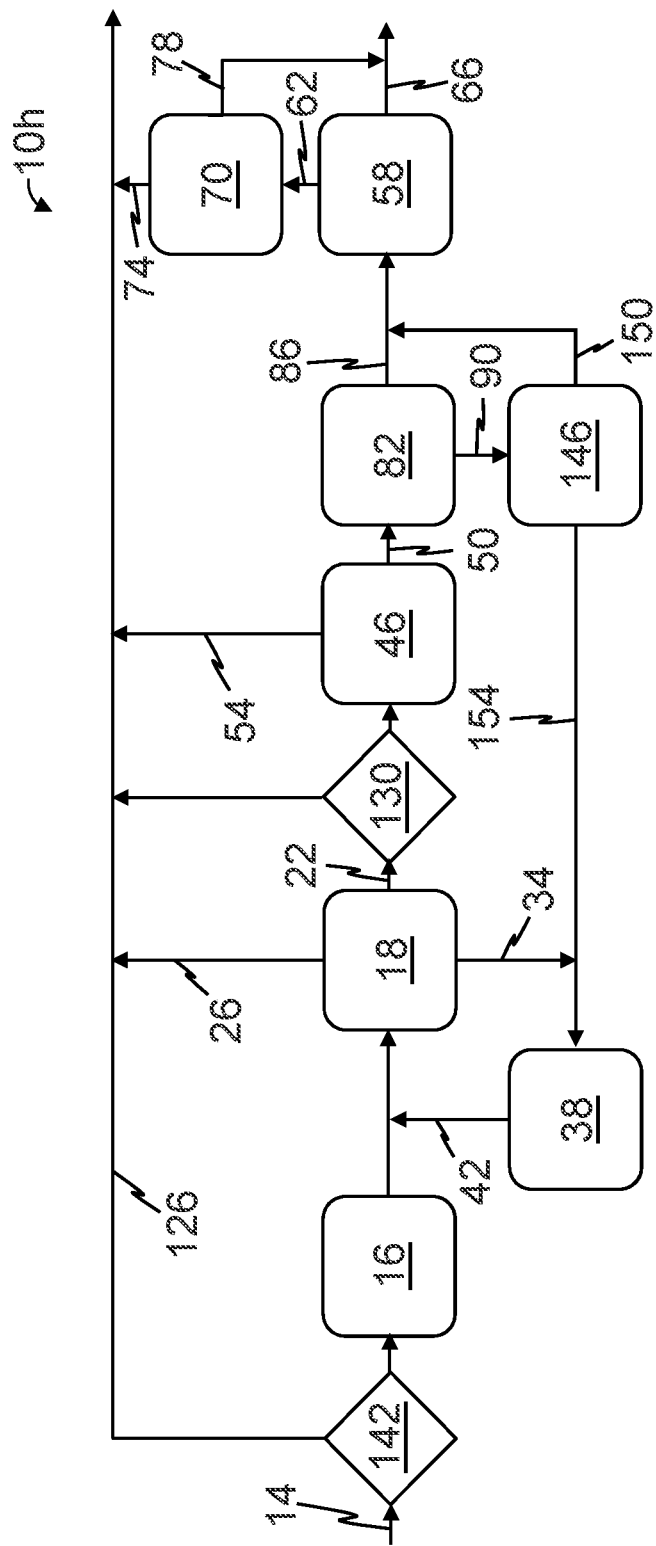
FIG. 15 is a diagram of an eighth embodiment of the present systems.

FIG. 15 is a diagram of an eighth embodiment 10*h* of the present systems. System 10*h* may be substantially similar to system 10*g*, with the primary exceptions described below. In system 10*h*, as in other systems, separator 70 and/or separator 58 may be configured to receive at least a portion of wood fiber-elements feed 86 and/or wood fiber-elements feed 150 and separate the received portion(s) into high-density-elements feed 62 and low-density-elements feed 66 and/or high-density-elements feed 74 and low-density-elements feed 78. In other words, separator 70 and/or separator 58 may be described as downstream of sorter 82 and/or separator 146.

Figure 16:
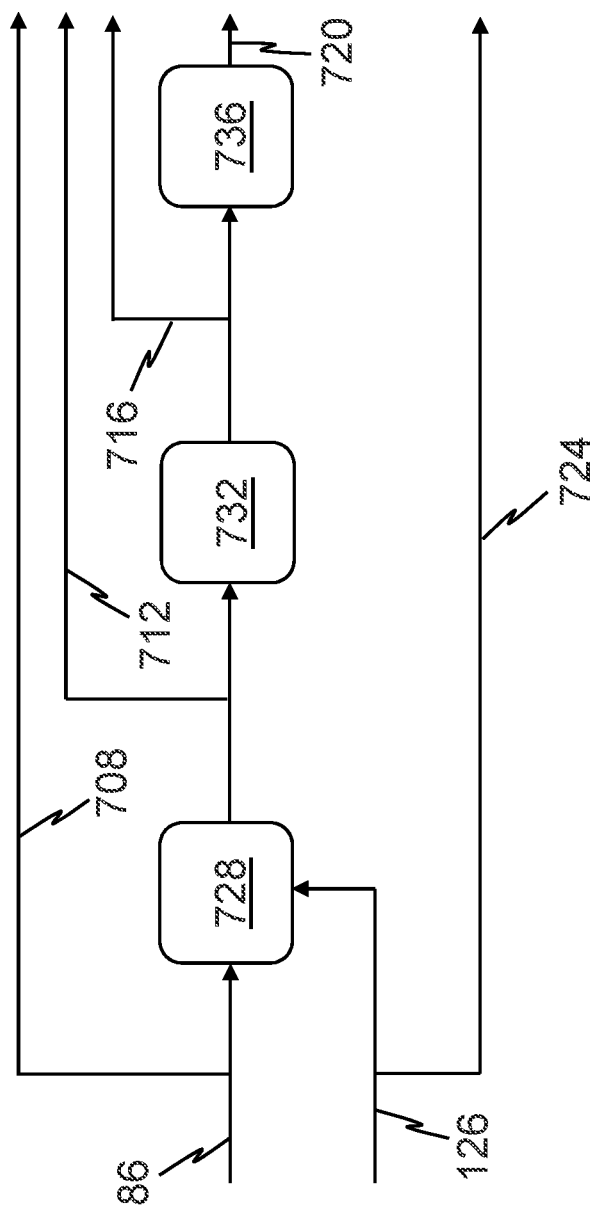
FIG. 16 is a diagram depicting outputs of some embodiments of the present disclosure.

As shown in FIG. 16, embodiments of the present disclosure may be configured to provide a variety of outputs, such as, for example, wood chips (e.g., 708), dried wood chips (e.g., 712), wood fiber fuel (e.g., 716), wood pellets or briquettes (e.g., 720), hog fuel (e.g., 724), and/or the like. For example, at least a portion of a wood fiber-elements feed (e.g., 86) may be provided (e.g., directly) as wood chips (e.g., 708) and/or at least a portion of a hog fuel feed (e.g., 126) may be provided (e.g., directly) as hog fuel (e.g., 724). For further example, at least a portion of a wood fiber-elements feed (e.g., 86) may be dried (e.g., in drier 728) to produce dried wood chips (e.g., 712), which may be suitable for use as a biomass fuel, as a material for manufacturing wood-based products, and/or the like. Such a drier (e.g., 728) may comprise a furnace that is fueled, at least in part, by a hog fuel feed (e.g., 126). For yet further example, dried wood chips (e.g., 712) may be size-reduced (e.g., to a maximum element size of approximately 0.5 mm in transverse dimension and/or approximately 3 mm in length), using, for example, a grinder (e.g., 732), to produce wood fiber fuel (e.g., 716). Such wood fiber fuel (e.g., 716) may be used for a variety of purposes, such as, for example, to produce power in a coal-fired power plant via being co-fired with coal. For still further example, wood fiber fuel (e.g., 716) may be pressed into pellets or briquettes (e.g., 720) (e.g., using pellet or briquette press 736). Such a drier (e.g., 728), grinder (e.g., 732), pellet or briquette press (e.g., 736), and/or the like may be located on-site with other components of a system (e.g., 10a, 10b, 10c, 10d, 10e, 10f, 10g, 10h, and/or the like) and/or may be located off-site (e.g., at another facility).

Some of the present methods for producing wood fiber from forest residue comprise filtering (e.g., with filter 18) a forest residue feed (e.g., 14) into a first large-elements feed (e.g., 22) having a first maximum element size and a first small-elements feed (e.g., 26) having a second maximum element size that is smaller than the first maximum element size, separating (e.g., with separator 58) at least a portion of the first large-elements feed into a first high-density-elements feed (e.g., 62) and a first low-density-elements feed (e.g., 66) having a lower maximum element density than that of the first high-density-elements feed, and sorting (e.g., with sorter 82) at least a portion of the first low-density-elements feed into a first wood fiber-elements feed (e.g., 86) and a first bark-elements feed (e.g., 90) having a lower aggregate wood fiber content than that of the first wood fiber-elements feed.

Some embodiments of the present methods for producing wood fiber from forest residue comprise separating (e.g., with separator 58) at least a portion of a forest residue feed (e.g., 14) into a first high-density-elements feed (e.g., 62) and a first low-density-elements feed (e.g., 66) having a lower maximum element density than that of the first high-density-elements feed, filtering (e.g., with filter 18) at least a portion of the first low-density-elements feed into a first large-elements feed (e.g., 22) having a first maximum element size and a first small-elements feed (e.g., 26) having a second maximum element size that is smaller than the first maximum element size, and sorting (e.g., with sorter 82) at least a portion of the first large-elements feed into a first wood fiber-elements feed (e.g., 86) and a first bark-elements feed (e.g., 90) having a lower aggregate wood fiber content than that of the first wood fiber-elements feed.

In some embodiments, the forest residue feed comprises at least one of: shredded, ground, and chipped forest residue. Some embodiments comprise removing (e.g., with magnetic separator 16) ferromagnetic materials from at least a portion of the forest residue feed. Some embodiments comprise providing (e.g., with diverter 130) at least a portion of the first large-elements feed to a hog fuel feed (e.g., 126). In some embodiments, the first maximum element size is approximately 50 mm. In some embodiments, the second maximum element size is approximately 8 mm.

Some embodiments comprise separating (e.g., with separator 46) a least a portion of the first large-elements feed into a high-areal-density-elements feed and a low-areal-density-elements feed having a lower maximum element areal density than that of the high-areal-density-elements feed and sorting (e.g., with sorter 82) at least a portion of the high-areal-density-elements feed into the first wood fiber-elements feed and the first bark-elements feed. Some embodiments comprise separating (e.g., with separator 58) at least a portion of the high-areal-density-elements feed into the first high-density-elements feed and the first low-density-elements feed. Some embodiments comprise separating (e.g., with separator 46) at least a portion of the first low-density-elements feed into the high-areal-density-elements feed and the low-areal-density-elements feed.

Some embodiments comprise filtering (e.g., with filter 18) the forest residue feed into a second large-elements feed (e.g., 34) having a third maximum element size that is larger than the first maximum element size and reducing the size of (e.g., with size-reducing machine 38) the second large-elements feed to produce at least a portion of a second small-elements feed (e.g., 42) having a fourth maximum element size that is smaller than the third maximum element size. In some embodiments, reducing the size of the second large-elements feed comprises at least one of: shredding, grinding, and granulating. In some embodiments, the third maximum element size is greater than 50 mm. In some embodiments, the fourth maximum element size is 50 mm or smaller.

Some embodiments comprise filtering (e.g., with filter 18) at least a portion of the second small-elements feed into at least one of: the first large-elements feed, the first small-elements feed, and the second large-elements feed. Some embodiments comprise separating (e.g., with separator 46) at least a portion of the second small-elements feed into the high-areal-density-elements feed and the low-areal-density-elements feed. Some embodiments comprise separating (e.g., with separator 58) at least a portion of the second small-elements feed into the first high-density-elements feed and the first low-density-elements feed.

Some embodiments comprise separating (e.g., with separator 70) the first high-density-elements feed into a second high-density-elements feed (e.g., 74) and a second low-density-elements feed (e.g., 78) having a lower maximum element density than that of the second high-density-elements feed. Some embodiments comprise sorting (e.g., with sorter 82) at least a portion of the second low-density-elements feed into the first wood fiber-elements feed and the first bark-elements feed. Some embodiments comprise separating (e.g., with separator 46) at least a portion of the second low-density-elements feed into the high-areal-density-elements feed and the low-areal-density-elements feed. Some embodiments comprise filtering (e.g., with filter 18) at least a portion of the second low-density-elements feed into the first large-elements feed and the first small-elements feed.

Some embodiments comprise filtering (e.g., with filter 102) at least a portion of the first bark-elements feed into a third large-elements feed (e.g., 106) and a fourth small-elements feed (e.g., 110) having a seventh maximum element size that is smaller than a maximum element size of the third large-elements feed. In some embodiments, the seventh maximum element size is approximately 8 mm (e.g., system 10a) or approximately 20 mm (e.g., system 10d). Some embodiments comprise reducing the size of (e.g., with size-reducing machine 38) at least a portion of the third large-elements feed to produce at least a portion of the second small-elements feed.

Some embodiments comprise sorting (e.g., with sorter 82) at least a portion of the third large-elements feed into the first wood fiber-elements feed and the first bark-elements feed. In some embodiments, the bark-elements feed has a fifth maximum element size and the method comprises reducing the size of (e.g., with size-reducing machine 94) at least a portion of the first bark-elements feed to produce at least a portion of a third small-elements feed (e.g., 98) having a sixth maximum element size that is smaller than the fifth maximum element size and filtering (e.g., with filter 102) at least a portion of the third small-elements feed into the third large-elements feed and the fourth small-elements feed. In some embodiments, reducing the size of at least a portion of the first bark-elements feed comprises at least one of: shredding, grinding, and granulating. In some embodiments, the fifth maximum element size is approximately 50 mm. In some embodiments, the sixth maximum element size is approximately 25 mm.

Some embodiments comprise sorting (e.g., with sorter 146) at least a portion of the first bark-elements feed into a second wood-fiber elements feed (e.g., 150) and a second bark-elements feed (e.g., 154) having a lower aggregate wood fiber content than that of the second wood-fiber elements feed. Some embodiments comprise reducing the size of (e.g., with size-reducing machine 38) at least a portion of the second bark-elements feed to produce at least a portion of the second small-elements feed.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method for producing wood fiber from forest residue, the method comprising:
    filtering at least a portion of a forest residue feed into:
        a first large-elements feed having a first maximum element size; and
        a small-elements feed having a second maximum element size that is smaller than the first maximum element size;
    sorting at least a portion of the first large-elements feed into a first wood fiber-elements feed and a first bark-elements feed having a lower aggregate wood fiber content than that of the first wood fiber-elements feed; and
    size-reducing at least a portion of the first bark-elements feed to produce a reduced-size bark-elements feed;
    where the filtering comprises filtering at least a portion of the reduced-size bark-elements feed into the first large-elements feed and the small-elements feed.

2. The method of claim 1, where:
    the first maximum element size is approximately 50 mm; and/or
    the second maximum element size is approximately 10 mm.

3. The method of claim 1, where the size-reducing at least a portion of the first bark-elements feed is performed using a shredder.

4. The method of claim 3, where the size-reducing at least a portion of the first bark-elements feed comprises:
    contacting at least a portion of the first bark-elements feed with a rotor of the shredder, the rotor including a plurality of teeth; and
    rotating the rotor at a rotational speed of between 50 revolutions per minute (rpm) and 250 rpm.

5. The method of claim 1, comprising:
    separating at least a portion of the forest residue feed into a first high-density-elements feed and a first low-density-elements feed having a lower maximum element density than that of the first high-density-elements feed;
    where the sorting comprises sorting at least a portion of the first low-density-elements feed into the first bark-elements feed and the first wood fiber-elements feed.

6. The method of claim 5, where the filtering comprises filtering at least a portion of the first low-density-elements feed into the first large-elements feed and the small-elements feed.

7. The method of claim 5, where the separating at least a portion of the forest residue feed into the first high-density-elements feed and the first low-density-elements feed is performed using a de-stoner, a ballistic separator, and/or an aerodynamic separator.

8. The method of claim 5, comprising:
    separating at least a portion of the forest residue feed into a high-areal-density-elements feed and a low-areal-density-elements feed having a lower maximum element areal density than that of the high-areal-density-elements feed;
    where the sorting comprises sorting at least a portion of the high-areal-density-elements feed into the first bark-elements feed and the first wood fiber-elements feed.

9. The method of claim 8, comprising separating at least a portion of the high-areal-density-elements feed into the first high-density-elements feed and the first low-density-elements feed.

10. The method of claim 8, comprising separating at least a portion of the first low-density-elements feed into the high-areal-density-elements feed and the low-areal-density-elements feed.

11. The method of claim 8, where the separating at least a portion of the forest residue feed into the high-areal-density-elements feed and the low-areal-density-elements feed is performed using an aerodynamic separator.

12. The method of claim 1, where the sorting is performed using an optical sorter.

13. A system for producing wood fiber from forest residue, the system comprising:
   a filter configured to receive at least a portion of a forest residue feed and filter the received portion into:
      a first large-elements feed having a first maximum element size; and
      a small-elements feed having a second maximum element size that is smaller than the first maximum element size;
   a first sorter configured to receive at least a portion of the first large-elements feed and sort the received portion into a first wood fiber-elements feed and a first bark-elements feed having a lower aggregate wood fiber content than that of the first wood fiber-elements feed; and
   a size-reducing machine configured to receive at least a portion of the first bark-elements feed and produce a reduced-size bark-elements feed;
   where the filter is configured to receive and filter at least a portion of the reduced-size bark-elements feed.

14. The system of claim 13, where:
   the first maximum element size is approximately 50 mm; and/or
   the second maximum element size is approximately 10 mm.

15. The system of claim 13, where the size-reducing machine comprises a shredder.

16. The system of claim 13, comprising:
   a first separator configured to receive at least a portion of the forest residue feed and separate the received portion into a first high-density-elements feed and a first low-density-elements feed having a lower maximum element density than that of the first high-density-elements feed;
   where the first sorter is configured to receive and sort at least a portion of the first low-density-elements feed.

17. The system of claim 16, where the filter is configured to receive and filter at least a portion of the first low-density-elements feed.

18. The system of claim 16, comprising:
   a second separator configured to receive at least a portion of the first high-density-elements feed and separate the received portion into a second high-density-elements feed and a second low-density-elements feed having a lower maximum element density than that of the second high-density-elements feed;
   where the first sorter is configured to receive and sort at least a portion of the second low-density-elements feed.

19. The system of claim 16, comprising:
   a second separator configured to receive at least a portion of the forest residue feed and separate the received portion into a high-areal-density-elements feed and a low-areal-density-elements feed having a lower maximum element areal density than that of the high-areal-density-elements feed;
   where the first sorter is configured to receive and sort at least a portion of the high-areal-density-elements feed.

20. The system of claim 19, where the second separator comprises an aerodynamic separator.

* * * * *